United States Patent [19]
Emge et al.

[11] Patent Number: 6,037,968
[45] Date of Patent: *Mar. 14, 2000

[54] SCANNED MARKING OF WORKPIECES

[75] Inventors: Garry J. Emge, Keene; Stephen W. Carter, Troy; David G. Georgis, Dublin; James T. McCann, Marlow, all of N.H.

[73] Assignee: Markem Corporation, Keene, N.H.

[ * ] Notice: This patent issued on a continued prosecution application filed under 37 CFR 1.53(d), and is subject to the twenty year patent term provisions of 35 U.S.C. 154(a)(2).

[21] Appl. No.: 08/568,269

[22] Filed: Dec. 6, 1995

Related U.S. Application Data

[63] Continuation-in-part of application No. 08/149,551, Nov. 9, 1993.

[51] Int. Cl.⁷ .................................................. B41J 2/435
[52] U.S. Cl. ...................... 347/260; 347/134; 347/256; 347/259; 346/107.4; 346/107.5; 346/107.6; 359/297; 359/299
[58] Field of Search .................................. 347/262, 232, 347/248, 234, 256, 258, 259, 260, 241, 242, 243, 134, 264; 359/558, 298, 299; 382/152; 399/367; 346/107.4, 107.5, 107.6

[56] References Cited

U.S. PATENT DOCUMENTS

| | | | |
|---|---|---|---|
| 3,351,948 | 11/1967 | Bonn | 346/76 |
| 3,745,235 | 7/1973 | Bestenreiner et al. | 178/5.2 R |
| 3,745,586 | 7/1973 | Braudy | 346/76 |
| 3,751,587 | 8/1973 | Insler et al. | 178/6.6 R |
| 3,780,214 | 12/1973 | Bestenreiner et al. | 178/5.2 R |
| 3,787,210 | 1/1974 | Roberts | 96/27 E |
| 3,798,365 | 3/1974 | Browning et al. | 178/6.6 A |
| 3,964,389 | 6/1976 | Peterson | 101/467 |
| 3,978,247 | 8/1976 | Braudy et al. | 427/43 |
| 4,024,545 | 5/1977 | Dowling et al. | 346/76 L |
| 4,386,272 | 5/1983 | Check, Jr. et al. | 250/236 |
| 4,532,527 | 7/1985 | Behrens et al. | 347/241 |

(List continued on next page.)

FOREIGN PATENT DOCUMENTS

| | | | |
|---|---|---|---|
| 0 135 851 | 4/1985 | European Pat. Off. | B23K 26/06 |
| 0 291 461 | 11/1988 | European Pat. Off. | G06K 15/12 |
| 0 343 443 | 11/1989 | European Pat. Off. | G06K 15/12 |
| 0 464 588 A1 | 1/1992 | European Pat. Off. | |
| 0 522 980 | 1/1993 | European Pat. Off. | G06K 15/00 |
| 0 541 460 | 5/1993 | European Pat. Off. | |
| 0 672 925 | 9/1995 | European Pat. Off. | |
| 0 715 200 | 6/1996 | European Pat. Off. | |
| WO 92/09441 | 6/1992 | WIPO | |
| WO 95 13593 | 5/1995 | WIPO | |

OTHER PUBLICATIONS

I–Yin et al. Dynamics of Laser Ablation Transfer Imaging Investigated by Ultrafast Microscopy, Journal of Imaging Science and Technology, vol. 36, No. 2, pp. 180–187, 1992.

Irie et al., High–Definition Thermal Transfer Printing Using Laser Heating, Journal of Imaging Science and Technology, vol. 37, No. 3, pp. 231–234, 1993.

(List continued on next page.)

*Primary Examiner*—Huan Tran
*Assistant Examiner*—Hai C. Pham
*Attorney, Agent, or Firm*—Fish & Richardson P.C.

[57] ABSTRACT

A technique for marking pixels on workpieces by routing a scanned beam to different marking stations to mark individual pixels on the workpieces. A diffractive scan lens focuses the beam. A mark is formed on a workpiece by producing the mark and curing the mark. Angular position of a scanning mirror in a raster scanner is determined by moving a beam, reflected from the scanner, across rulings on an optical element during scanning. A print head for printing spots on a surface of a workpiece has a walled, internally pressurized chamber and structure for causing an inked web to conform to a contour of the chamber wall and to be pulled along the chamber wall. A print head has a compliant-walled, internally pressurized chamber. A print head has a chamber having a low-coefficient of friction coating. Two workpieces may be marked at two marking stations by two-directional scanning.

36 Claims, 29 Drawing Sheets

U.S. PATENT DOCUMENTS

| | | | |
|---|---|---|---|
| 4,626,868 | 12/1986 | Tsai | 346/1.1 |
| 4,630,070 | 12/1986 | Sato | 347/256 |
| 4,652,722 | 3/1987 | Sachdev et al. | 346/1.1 |
| 4,675,498 | 6/1987 | Lemelson | 219/121 LB |
| 4,700,198 | 10/1987 | Shirahata et al. | 346/1.1 |
| 4,702,958 | 10/1987 | Itoh et al. | 428/323 |
| 4,804,977 | 2/1989 | Long | 346/76 L |
| 4,821,113 | 4/1989 | McQuade et al. | 358/510 |
| 4,982,206 | 1/1991 | Kessler et al. | 347/232 |
| 4,987,006 | 1/1991 | Williams et al. | 427/53 |
| 5,017,547 | 5/1991 | DeBoer | 503/227 |
| 5,019,549 | 5/1991 | Kellogg et al. | 503/227 |
| 5,021,808 | 6/1991 | Kohyama | 347/66 |
| 5,171,650 | 12/1992 | Ellis et al. | 430/20 |
| 5,181,137 | 1/1993 | Koide | 347/232 |
| 5,198,321 | 3/1993 | Hosoi et al. | 430/138 |
| 5,235,438 | 8/1993 | Sasada | 358/481 |
| 5,270,842 | 12/1993 | Clay et al. | 359/12 |
| 5,334,999 | 8/1994 | Kashiwazaki et al. | 347/65 |
| 5,395,729 | 3/1995 | Reardon et al. | 430/200 |
| 5,541,830 | 7/1996 | Moore et al. | 363/69 |

OTHER PUBLICATIONS

Irie et al., Thermal Transfer Color Printing Using Laser Heating, Journal of Imaging Science and Technology, vol. 37, No. 3, pp. 235–238, 1993.

Kellogg et al., CREO/Crosfield Interface for Infrared Diode Thermal Imaging, Journal of Imaging Science and Technology, vol. 36, No. 3, pp. 220–224, 1992.

Levene et al., Material Transfer Recording, Applied Optics, vol. 9, No. 10, pp. 2260–2265, 1970.

Tolbert et al., Dynamics of Laser Ablation Transfer Imaging Investigated by Ultrafast . . . , IS&T's 46th Annual Conference, pp. 208–210, 1993.

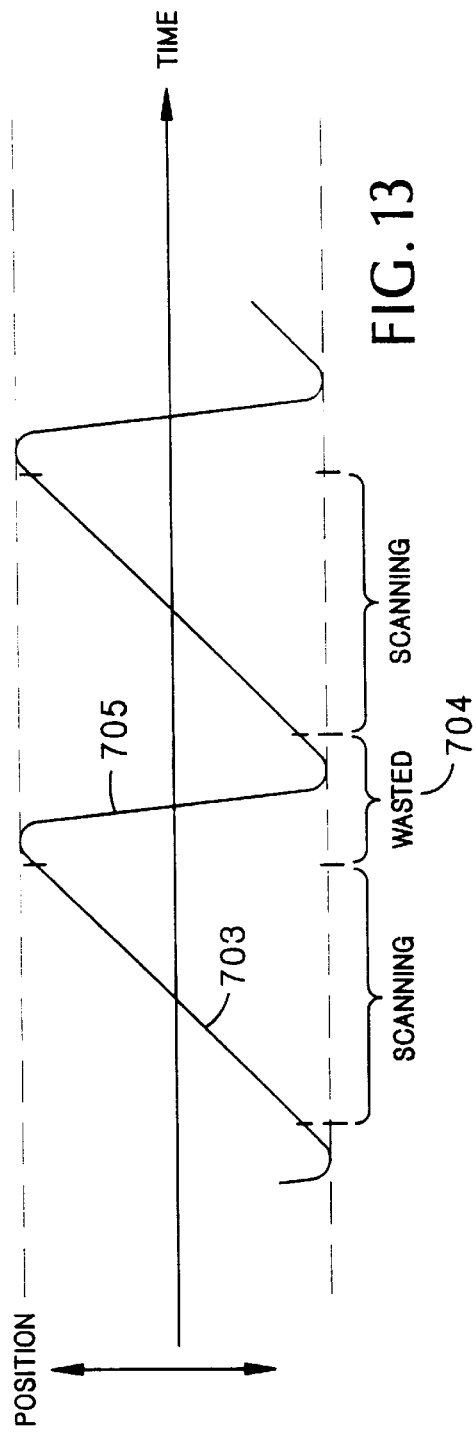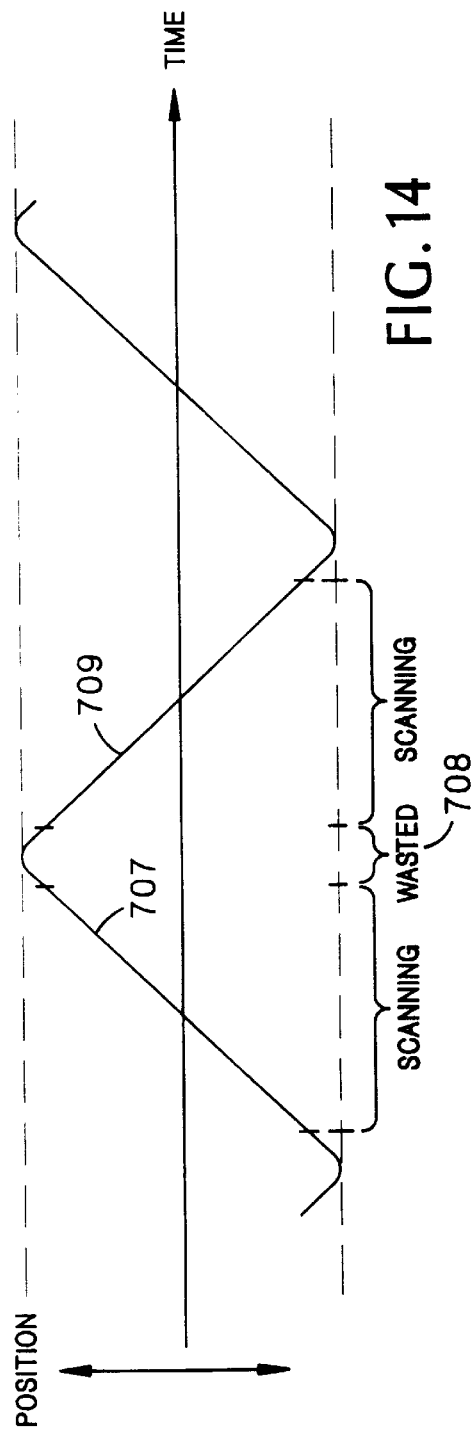

FULL FIELD
13.5deg
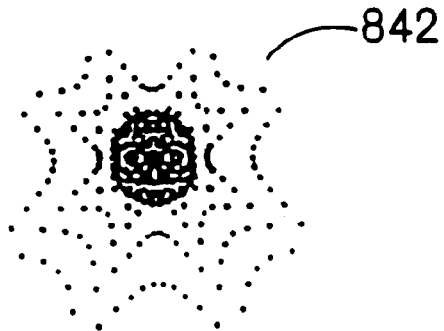
842
GEOMETRICAL
SPOT SIZE
0.001141
0.7 FIELD
9.45deg
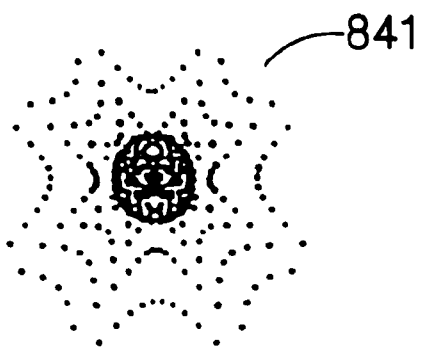
841
GEOMETRICAL
SPOT SIZE
0.001139
ON-AXIS
0deg
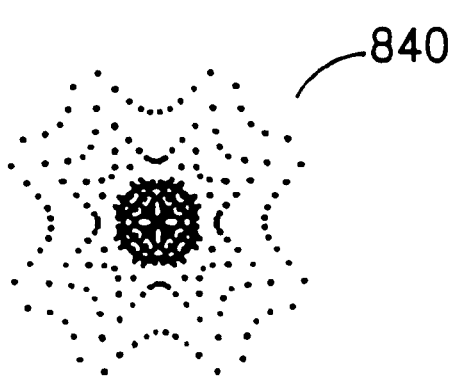
840
GEOMETRICAL
SPOT SIZE
0.001146
0.01
FIG. 18

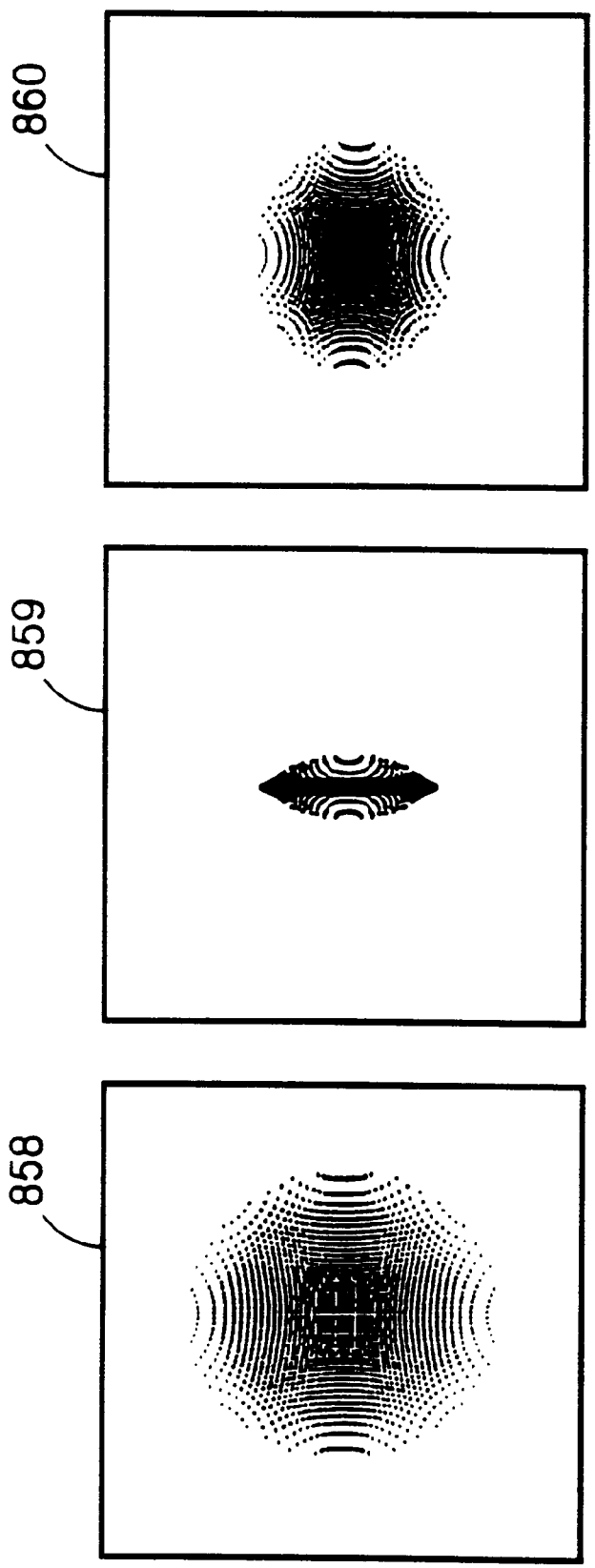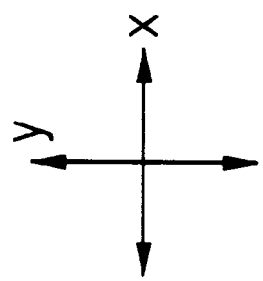
FIG. 20

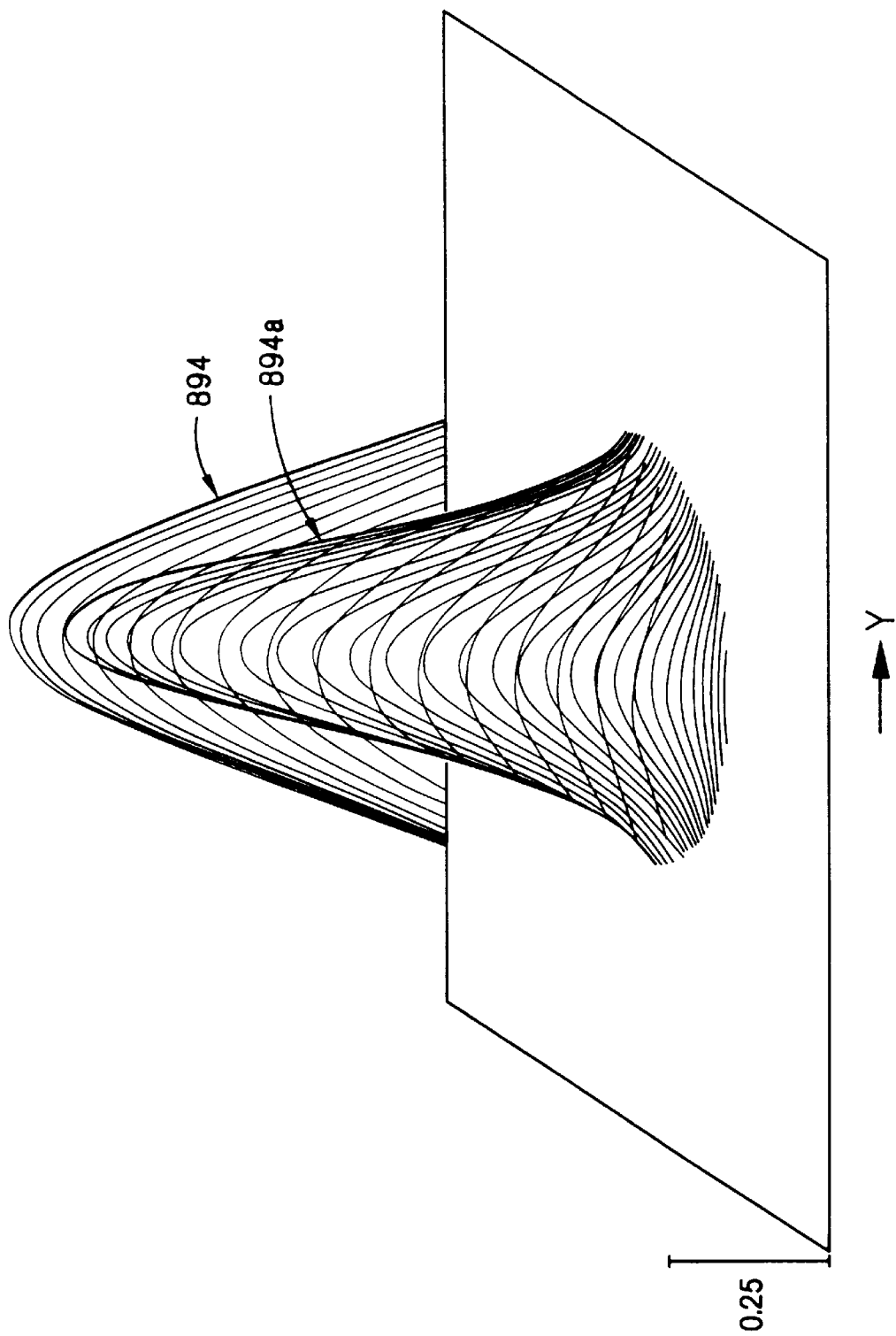

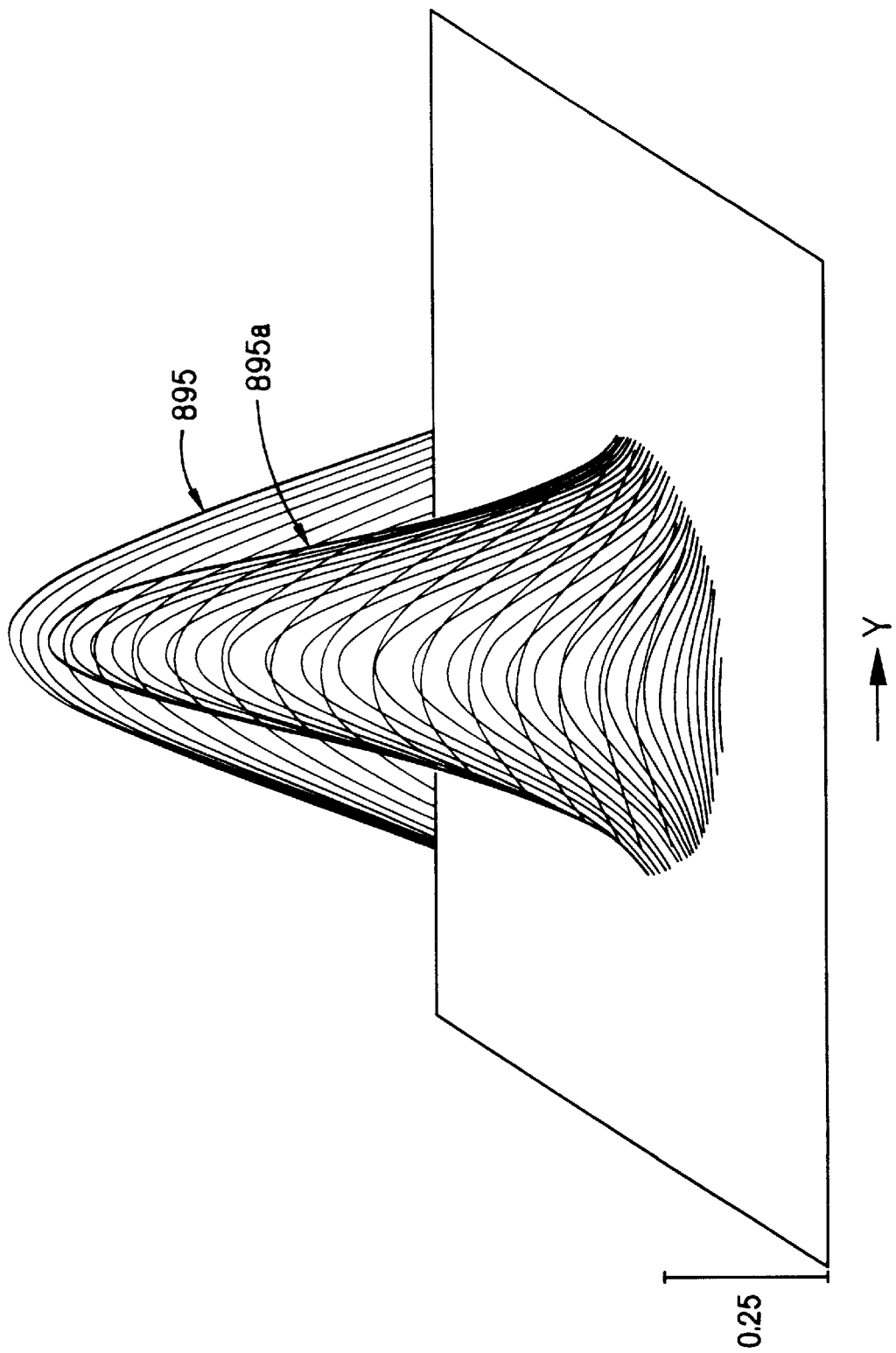

ABSTRACT# SCANNED MARKING OF WORKPIECES

This is a continuation-in-part of U.S. Ser. No. 08/149,551, entitled "SCANNED MARKING OF WORKPIECES", filed Nov. 9, 1993. The invention relates to scanned marking of workpieces.

BACKGROUND OF THE INVENTION

A typical raster scanned printing system scans a laser beam along a succession of parallel rows on a workpiece, one row at a time, to form a pixel pattern representing a two-dimensional image. Scanning is done by an oscillating mirror. During one direction of an oscillation a single row is scanned. The mirror is then quickly returned to its original position to begin scanning the next row. An optical encoder may be used to gauge the angular position of the mirror, to aid placing the pixel marks at precise locations along each scan row.

The pixel mark may be formed using an ink coated foil that transfers a spot of ink onto the workpiece in response to receiving laser beam energy at a pixel site.

SUMMARY OF THE INVENTION

In general, in one aspect, the invention features a technique for marking pixels on workpieces. The workpieces are positioned at respective marking stations for marking. A beam of radiation is directed along an optical path toward the workpieces. The beam is scanned (e.g., raster scanned) to define an array of pixel positions. A switch routes the beam during the scanning so that for each of the pixel positions the beam may be routed to a selected one of the marking stations to mark one of the pixels on one of the workpieces.

Implementations of the invention may include one or more of the following features. The pixels marked on the workpieces are organized as partial prints associated respectively with the different marking stations. A processor causes each of the workpieces to be positioned at each of the marking stations for a period which spans a complete scanning cycle of the beam. There is printing apparatus which responds to the beam for printing different colors of the pixels respectively at different ones of the marking stations. In some examples, the partial prints are different for different workpieces. The marking stations include printing foils which respond to radiation from the beam by depositing pigment or dye. The switch may be an acousto-optic deflector controlled by the processor in response to stored information corresponding to the pixels. The scanning apparatus includes an optical element for sweeping the beam along a scan line, and a mechanical element for moving each of the workpieces in a direction normal to the scan line. The processor causes each workpiece to be moved in succession to each of the marking stations for marking with corresponding ones of the partial prints. In some examples, there are two of the marking stations and the scanning apparatus raster scans a series of scan lines; every other line is scanned in one direction and the intervening lines are scanned in the opposite direction. The switch is arranged to cause marking of pixels on every other line at one of the marking stations, and marking of pixels on the intervening lines at the other of the marking stations. In some examples, the prints for the workpieces at the two marking stations are identical, monochrome prints. In some examples, portions of the partial prints are identical for at least two of the workpieces and other portions (e.g., serial numbers) are different.

The stored image information comprises, for each pixel location, a deflection value and an amplitude value. The stored information is fetched via a DMA channel of a computer during printing. The stored information is represented in a file format (e.g., .TIF) which has an associated palette matrix to which the stored information points.

In general, in another aspect of the invention, an optical element sweeps the beam along a scan line and a diffractive scan lens focuses the beam at an image plane associated with a surface of the workpiece. The scanned beam defines an array of pixel positions.

Implementations of the invention may include one or more of the following features. The scan lens has a front surface on which the beam impinges and a back surface, only the front surface is a diffractive surface. The scan lens includes a zero-power substrate. A plane parallel pressure window is located along the optical path between the scan lens and the image plane. The beam focused by the scan lens is a collimated beam. The beam of radiation is produced by a diode laser. An optical fiber delivers radiation to the optical element. The radiation exiting the fiber optic is collimated by a collimating lens creating the beam of radiation. A fold mirror redirects the beam of radiation.

In general, in another aspect, the invention features a technique for forming a mark on a workpiece. The workpiece is stationed at a marking station for producing and curing the mark. There is a first optical path from a first radiation source to a position on a workpiece for producing the mark, and a second optical path from a second radiation source to the position on the workpiece for curing the mark.

Implementations of the invention may include one or more of the following features. An optical element sweeps the first and second beams along a scan line for producing multiple marks on the workpiece. A scan lens focuses the first and second beams at an image plane located coincident with the surface. The scan lens has substantially the same focal length for the first beam and the second beam. The scan lens is an achromatic scan lens constructed from two different glasses. The mark is produced and cured substantially simultaneously. A beam combiner combines the first and second beams. The beam combiner includes a coating for reflecting the first beam and passing the second beam. The first beam is at a wavelength of about 970 to 980 nm. The second beam is at a wavelength of about 670 nm. The first beam is produced by a first diode laser and the second beam is produced by a second diode laser. The mark is produced and cured when the workpiece is in the same position relative to the apparatus. Multiple first and second beams of radiation are directed toward the workpiece to produce multiple marks on the workpiece.

In general, in another aspect, the invention features a technique for determining an angular position of a scanning mirror in a raster scanner. A source of a beam of radiation is aimed to be reflected from the scanning mirror during scanning. A ruled optical element receives the beam of radiation after reflection from the scanning mirror during scanning. The beam moves across rulings on the optical element during scanning. A detector receives the beam after it impinges on the ruled optical element for detecting when the beam moves across successive rulings during scanning.

Implementations of the invention may include one or more of the following features. The ruled optical element comprises a transparent substrate bearing parallel lines which obstruct the passage of the beam. A lens focuses the beam in the vicinity of the ruled optical element, and another lens collects and relays the beam after it has passed through the ruled optical element, the beam being redirected to fall on the detector during scanning. The lens is positioned between the light source and the scanning mirror such that the beam is focused on an arcuate focal plane. The lens is a single plano-convex glass lens. The ruled optical element is a curved element. The source is a diode laser.

In general, in another aspect, the invention features a print head for printing spots on a surface of a workpiece. An ink medium in continuous web form is capable of responding to an intense beam of radiation by transferring spots of ink onto the surface. There is a walled, internally pressurized chamber having an external curved surface and structure for causing the continuous web to conform to the contour of the external curved surface and to be pulled along the external curved surface. The external curved surface is interrupted by an aperture permitting internal pressure in the chamber to be applied against the web as it is pulled along the external curved surface. The chamber has a transparent window for allowing the beam to pass within the chamber and strike the continuous web at the aperture, elements for causing the workpiece to be held with its surface in an orientation to receive spots of ink from the ink medium and to be moved towards and past the aperture at a distance near enough to the aperture to cause the surface to contact the continuous web along a linear contact region and to disrupt the conformity of the web to the external surface at the contact region.

Implementations of the invention may include one or more of the following features. The external curved surface is parabolic. The aperture is located at an apex of the external curved surface. The external curved surface is flat in a dimension normal to the dimension in which the curved surface is parabolic, and the aperture extends across the flat dimension. The aperture does not extend completely across the curved surface. The continuous web is pulled along at a velocity which is approximately the same as a velocity of motion of the workpiece relative to the print head, or the velocity at which the web is pulled is sufficiently different from the velocity of motion of the workpiece to impart a small shear force between the web and the workpiece.

In general, in another aspect, the invention features a print head for placing marks on a surface of a workpiece. The ink medium in continuous web form is associated with an external surface of a compliant-walled, internally pressurized chamber. The chamber wall allows a beam to pass through the chamber wall and strike the continuous web.

Implementations of the invention may include one or more of the following features. A structure pulls the continuous web along the chamber wall. The compliant chamber permits the internal pressure in the chamber to be applied against the web as it is pulled along the chamber wall. The compliant-walled chamber comprises polyethylene or polypropylene. The workpiece surface includes an irregular surface and the compliant-wall permits intimate contact of the chamber with the irregular surface.

In general, in another aspect, the invention features a print head for printing spots on a surface of a workpiece. A chamber includes a slot for passage of a laser beam. The ink medium in continuous web form is in contact with a low-coefficient of friction coating of the chamber such that with the web in contact with the workpiece a seal is formed between the web and the chamber enabling the passage to be pressurized.

Implementations of the invention may include one or more of the following features. The workpiece surface includes an irregular surface and the pressurized chamber permits intimate contact of the web with the irregular surface. The web is placed under tension and the web is advanced by friction between the web and the workpiece, the tension being for stripping the web from the workpiece.

In general, in another aspect, the invention features a technique for marking two workpieces in which two-directional scanning apparatus scans the beam to define successive rows of pixel positions in an array, some of the rows being scanned by scanning motion in a first direction, others of the rows being scanned by scanning motion in an second direction opposite to the first direction. The beam is directed to scan some of the rows at one of the marking stations and others of the rows at another of the marking stations. In embodiments of the invention, every other one of the rows is scanned in the one direction at one of the marking stations, and the intervening rows are scanned in the opposite direction at the other one of the marking stations.

Advantages of the invention may include one or more of the following.

The invention is capable of producing an n color image by operation at n printing sites on a wide variety of substrates limited only by mechanical space and timing constraints. Variations are capable of producing process color with some degradation of throughput by overwriting existing scan lines (which would require two or more images with differing pixel parameters and would be slow). The n colors are realized with only a single laser and optical beam deflection/modulation mechanism, instead of n lasers/modulators, while high process rates are maintained.

The use of standard 256 color/indexed color. TIF file formats to define the image pixels has the advantage of permitting a variety of available software packages to be used to create the images. Use of the .TIF palette cells to directly define color/deflection, and amplitude eliminates the software and hardware overhead needed for look up table operations. Because only one byte is fetched per pixel, hardware bandwidth requirements are low and data transfer is very fast. Sixteen level grey scale printing will be possible using appropriate printing foils (coated webs). The .TIF format tag fields may be used for automatic setup to print a variety of dot densities, scan line lengths and number of scan lines. Images could be printed as composites of different files.

Using a non-rotating data storage medium to pass the image files from the image generation computer to the print control processor allows a separation of the two functions between an office and a printing location; but also permits them to coexist side by side at the printing location. In some environments it may be useful to isolate the machine operator from access to image generation functions, for quality control.

The scanner encoder which reads directly from a beam reflected from the scanner itself is more accurate, repeatable and linear than analog position sensors (e.g., variable capacitors). The encoder is also accurate in the face of a need for extremely high resolution, is generally invulnerable to vibrational modes of the scanner, and is unaffected by shaft flexibilities.

Other advantages and features will become apparent from the following description and from the claims.

DESCRIPTION

FIGS. 5, 6, 7, and 8, are perspective, side, bottom, and side views, respectively of a print head.

Figure 9:
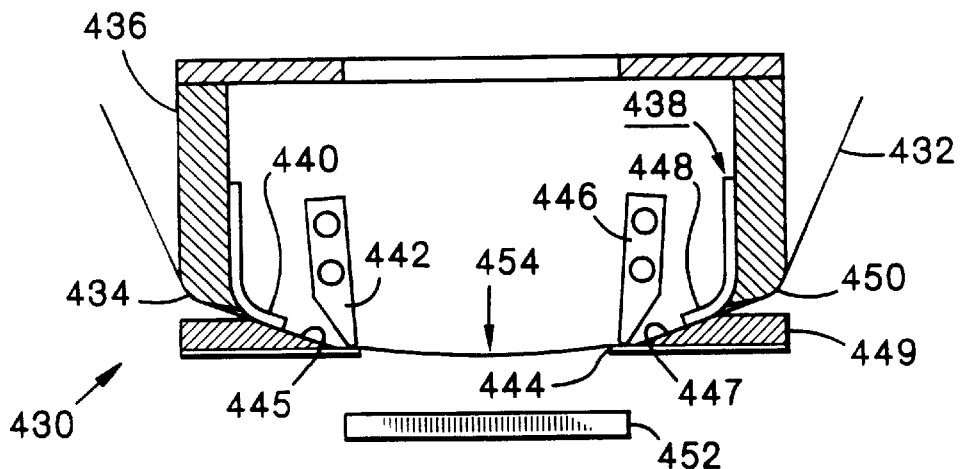
Figure 10:
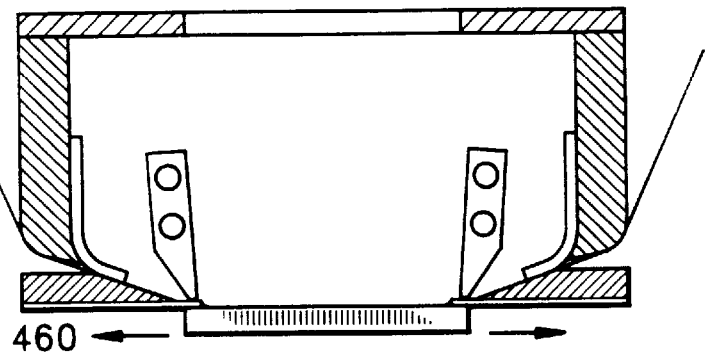
Figure 11:
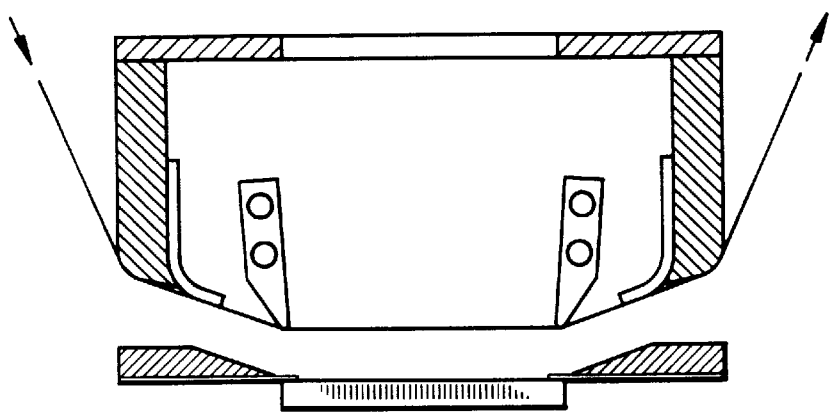

FIGS. 9, 10, and 11 are side views of an alternative print head.

Figure 12:
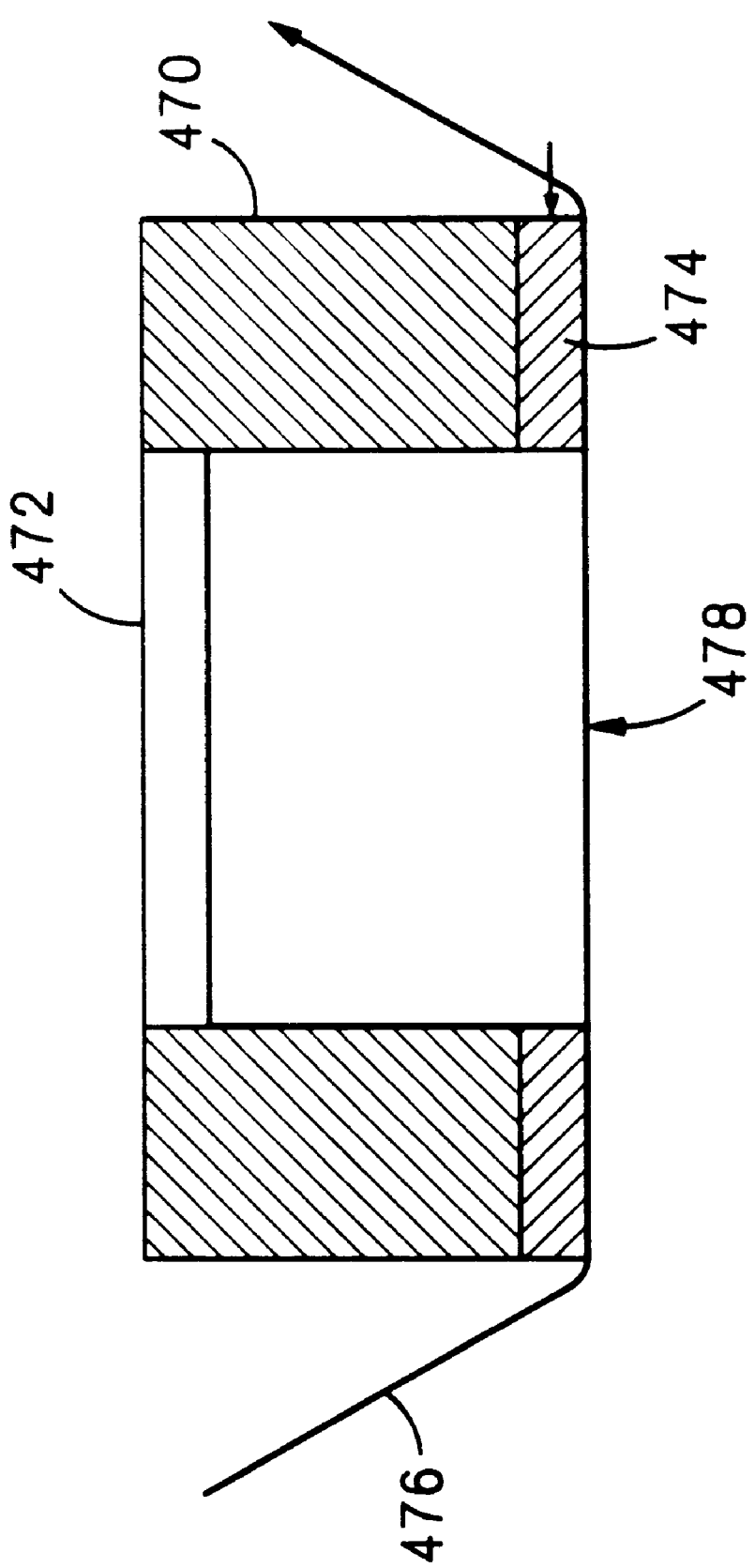

FIG. 12 is a side view of an alternative print head.

FIGS. 13 and 14 are diagrams of the motion of a scanning over time for one directional and bi-directional scanning.

Figure 15:
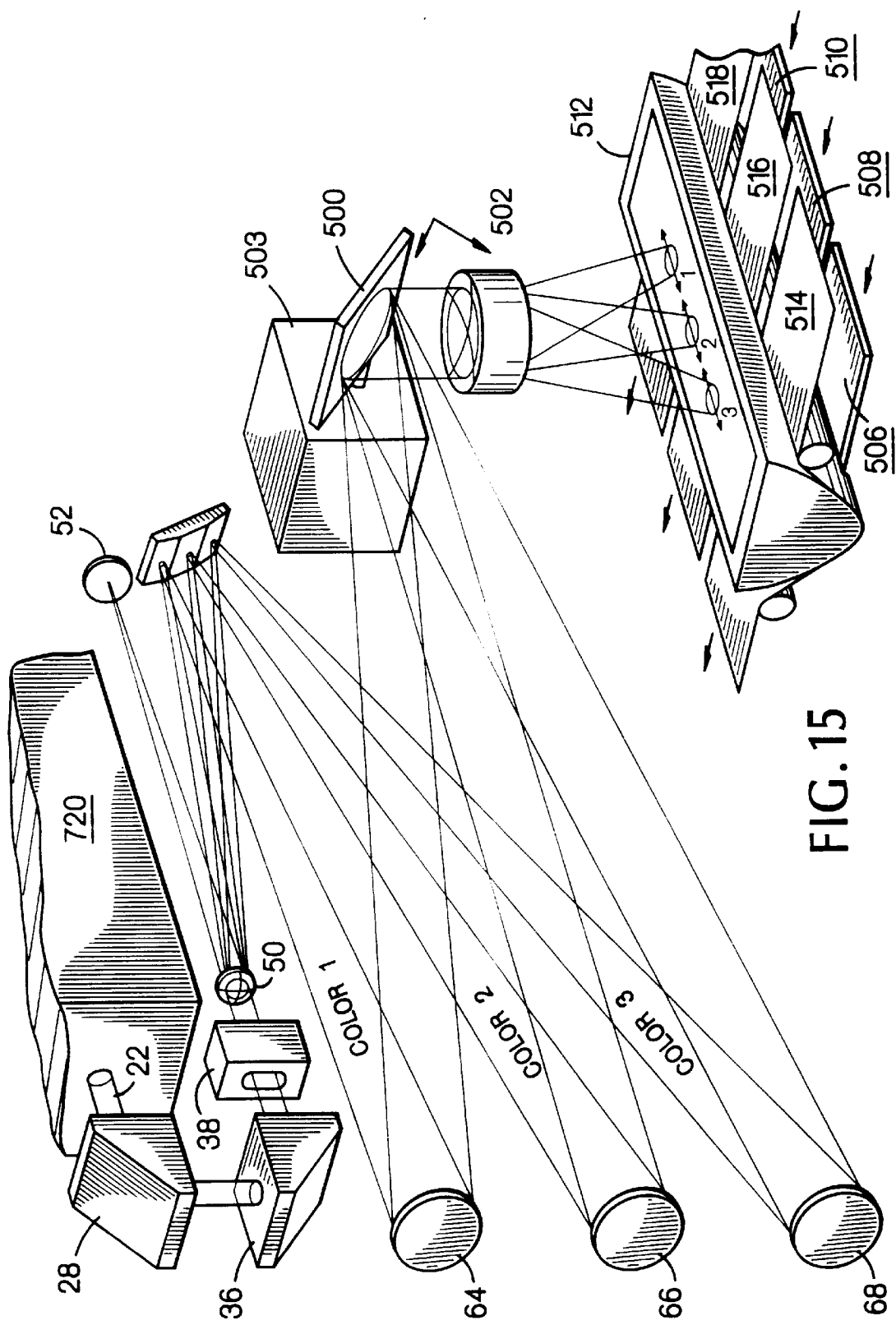

FIG. 15 is an alternative scanning scheme using a single scanning mirror and scan lens.

Figure 16:
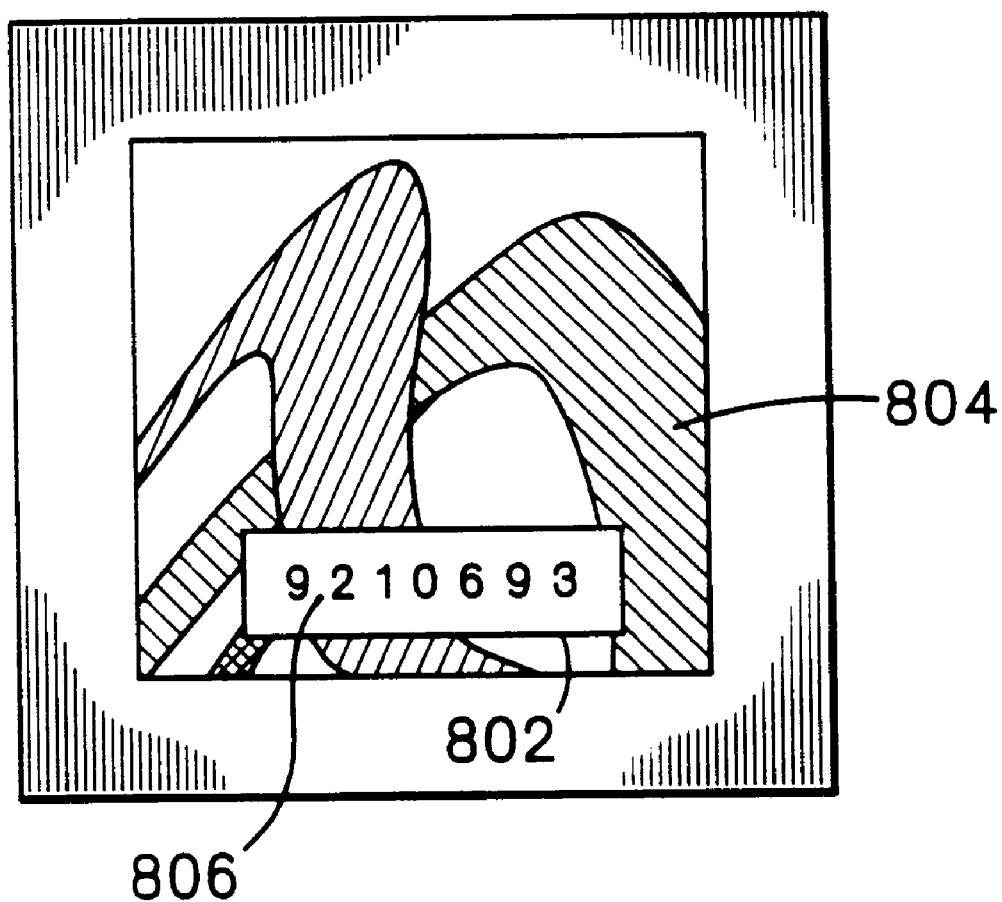

FIG. 16 is a top view of an image on a workpiece.

Figure 17:
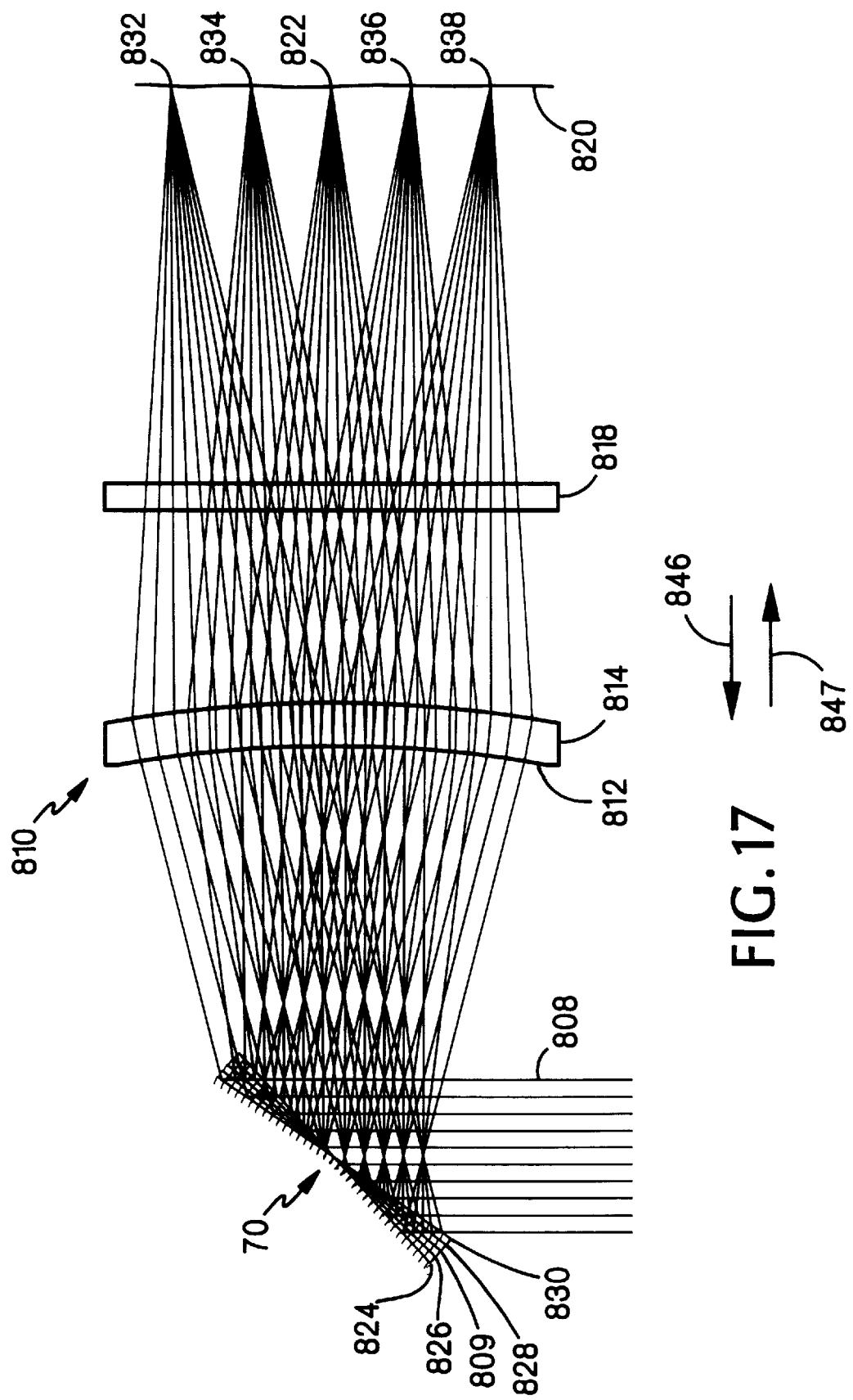

FIG. 17 is an alternative scanning scheme using a diffractive scan lens.

Figure 18A:
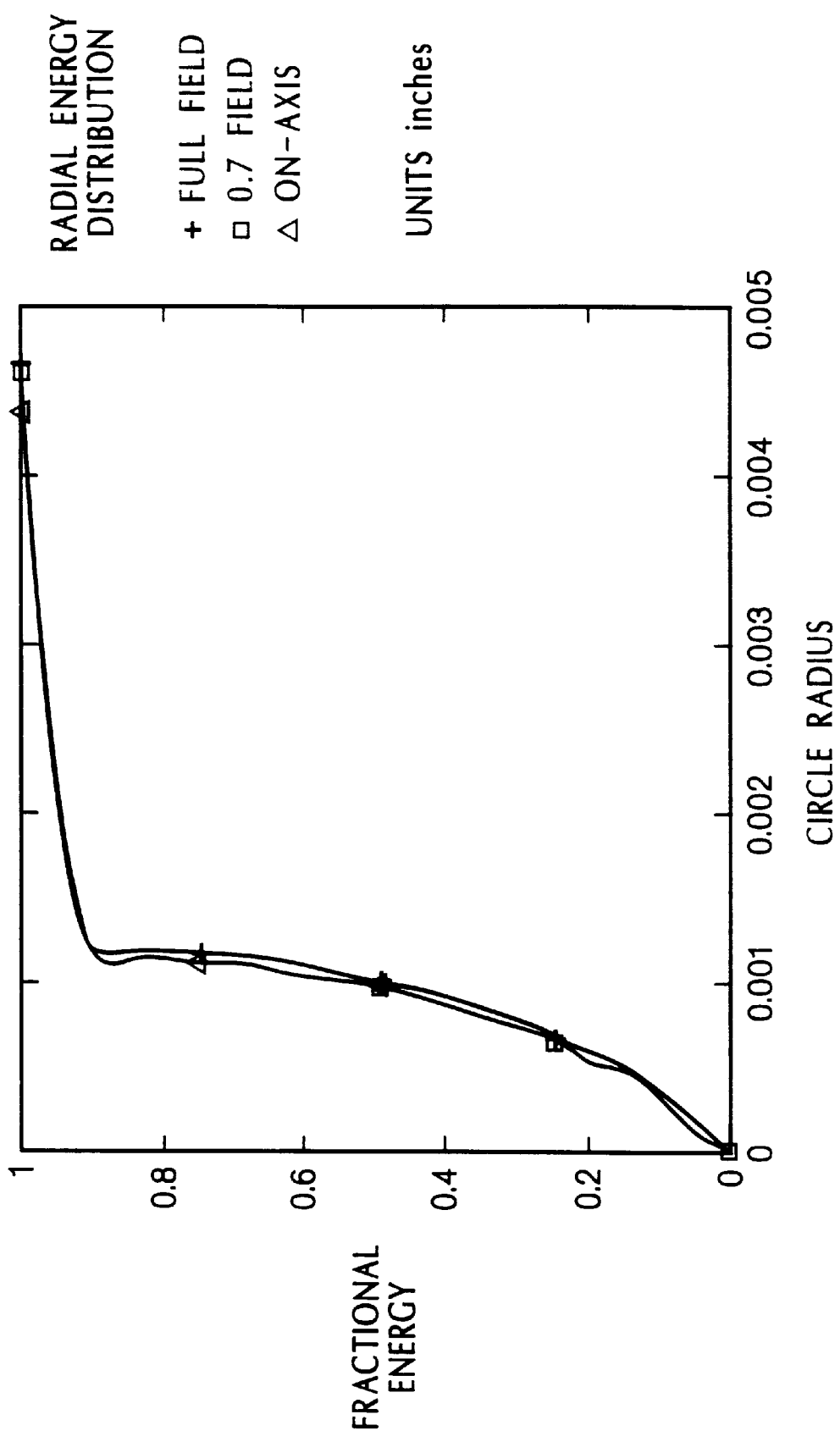
Figure 18B:
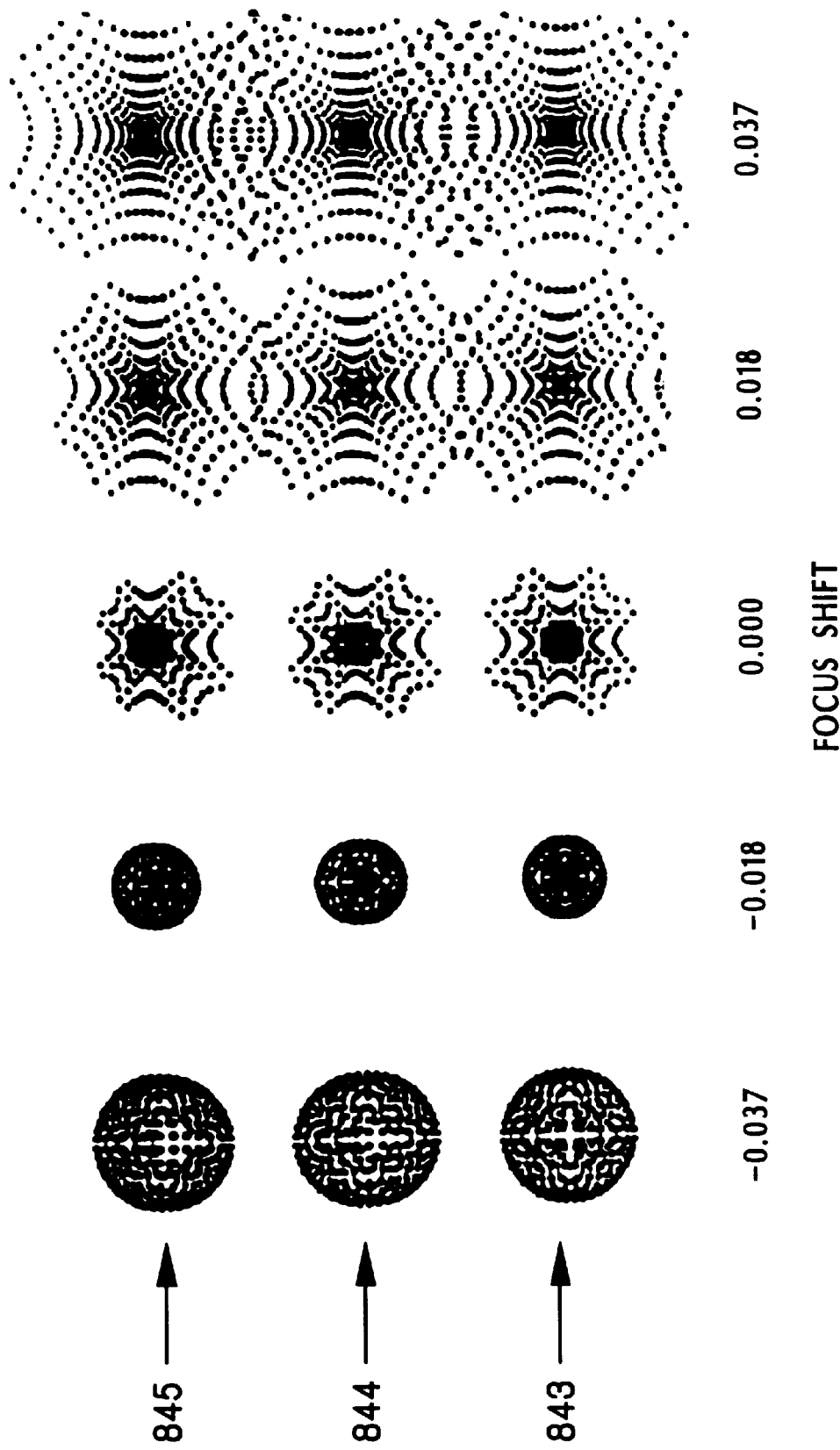

FIGS. 18, 18a, and 18b are diagrams representing the spot imaged at a focal plane using the scanning scheme of FIG. 17.

Figure 19:
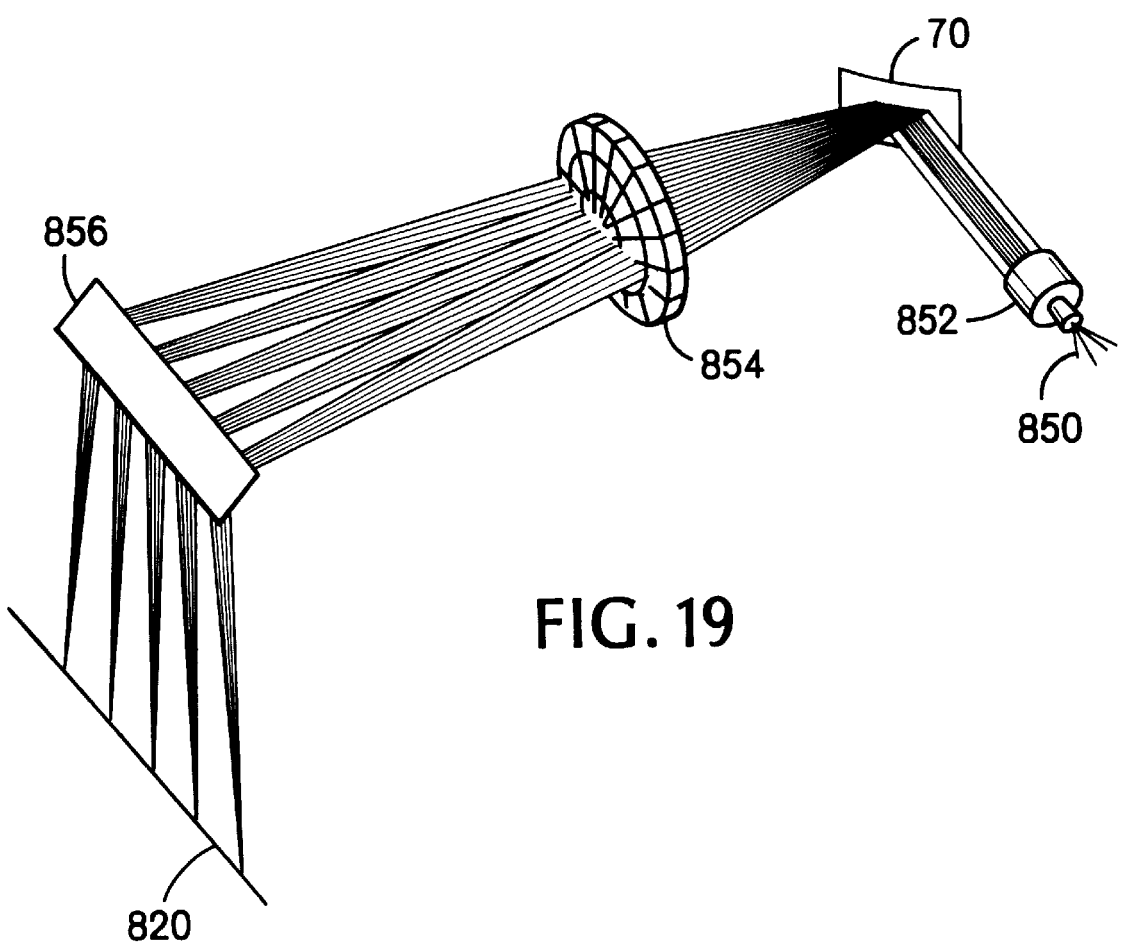

FIG. 19 is an alternative scanning scheme using a fiberoptic coupled laser beam.

Figure 21:
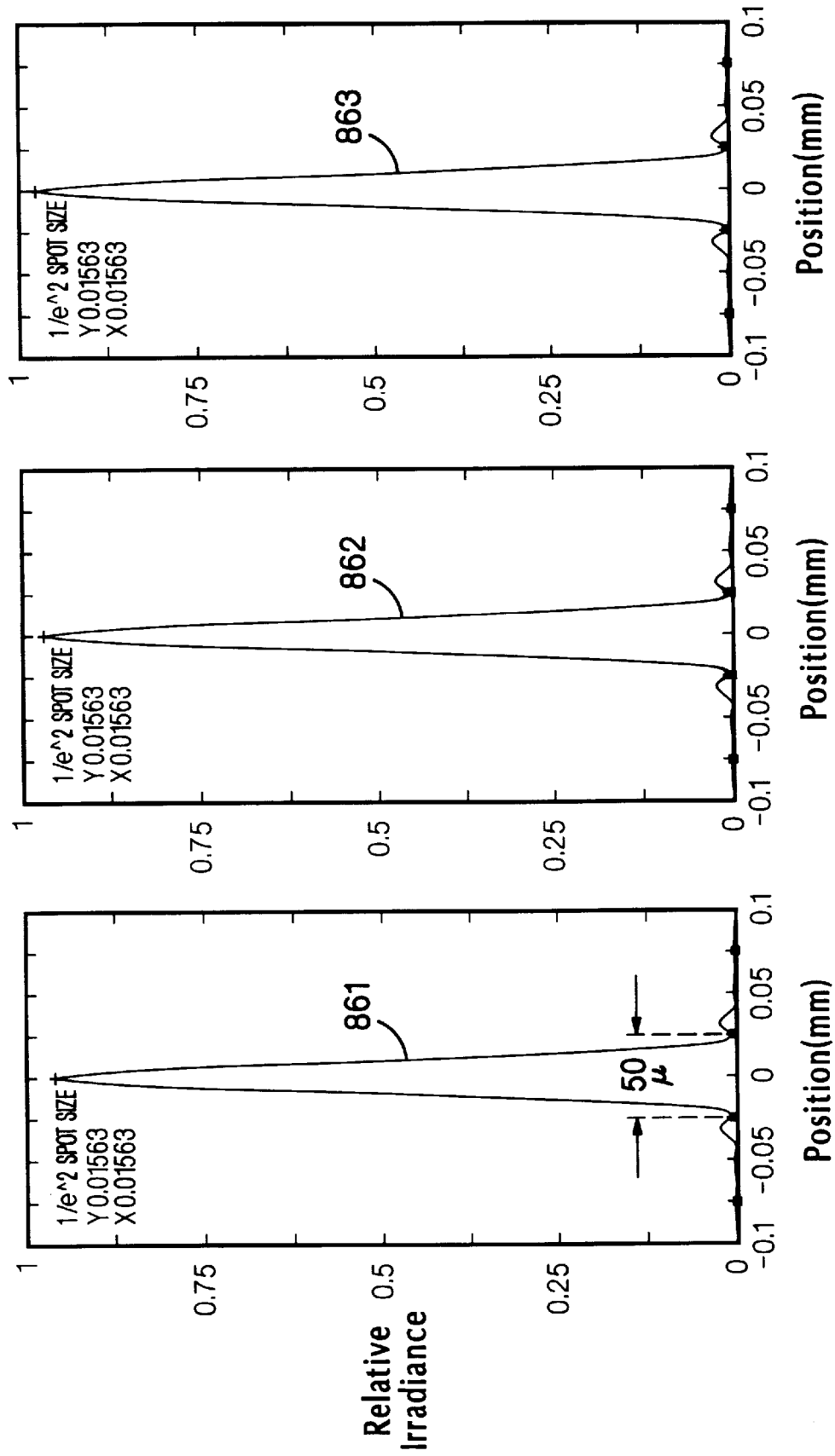

FIGS. 20 and 21 are diagrams representing the spot imaged at a focal plane using the scanning scheme of FIG. 19.

Figure 22:
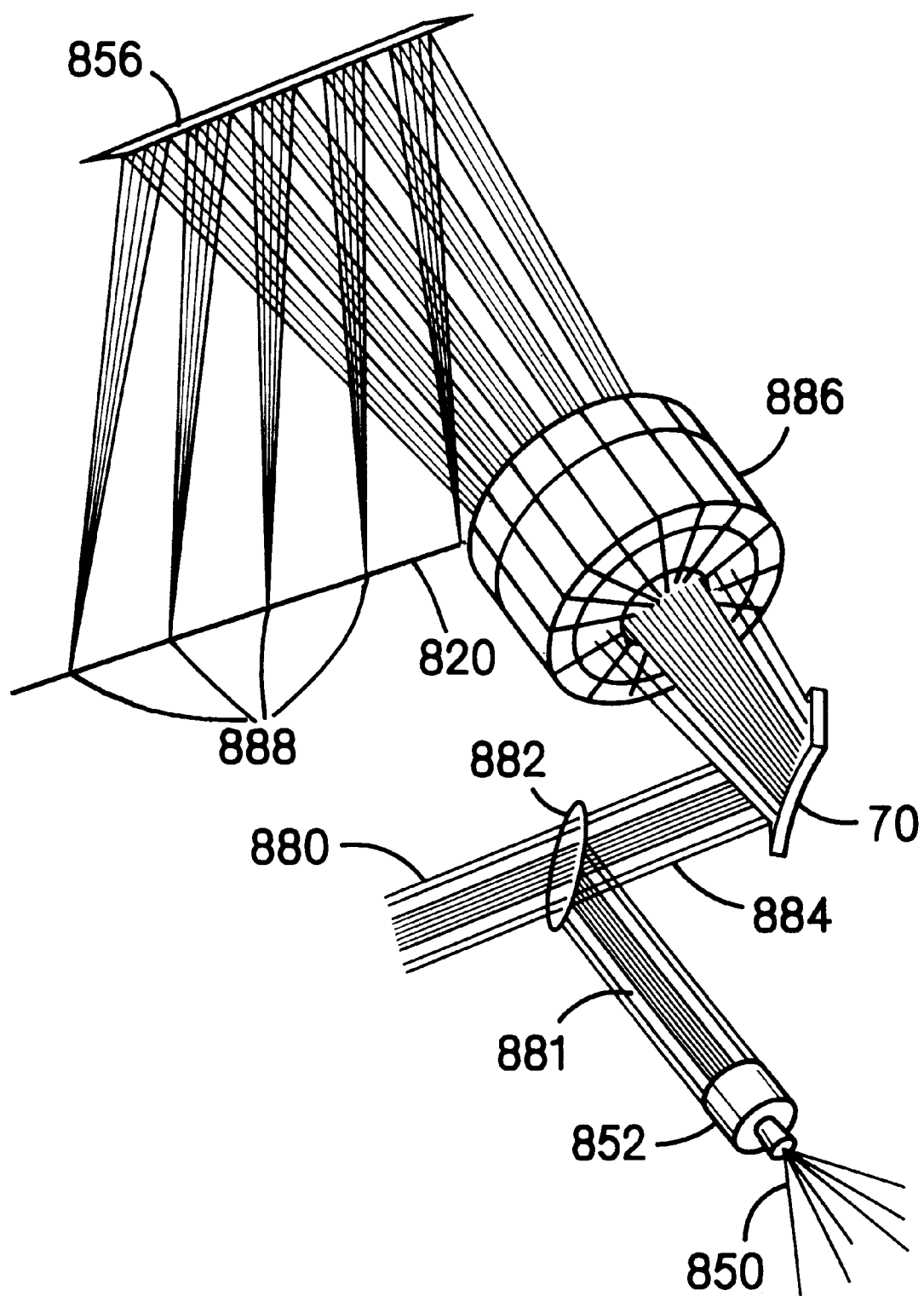

FIG. 22 is a scanning scheme for simultaneous marking and curing.

Figure 23:
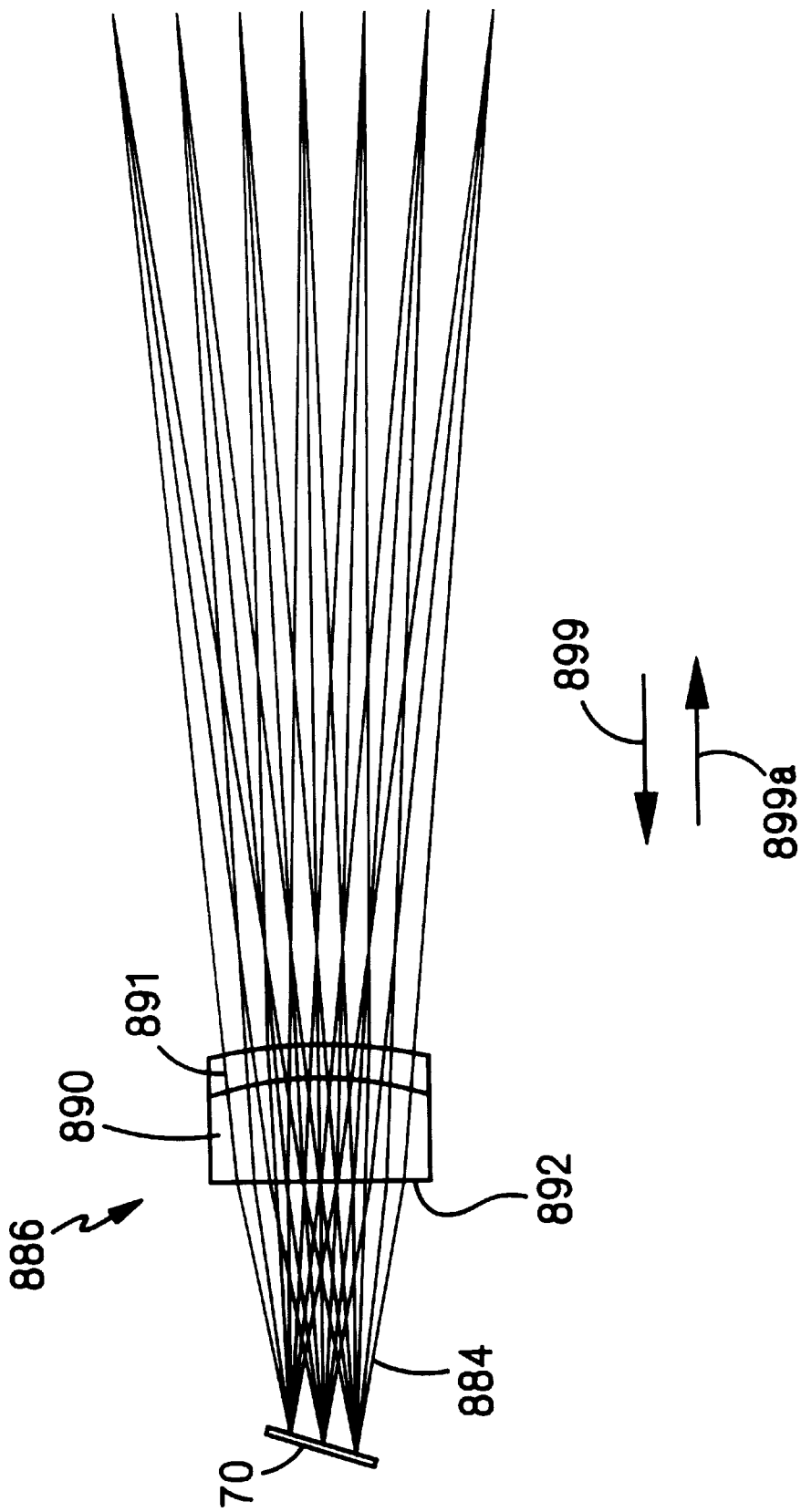

FIG. 23 is a diagram of an achromatic scan lens for use with the scanning scheme of FIG. 22.

FIGS. 24–24b and 25–25b are diagrams representing the spot imaged at a focal plane using the scanning scheme of FIG. 22.

Figure 26:
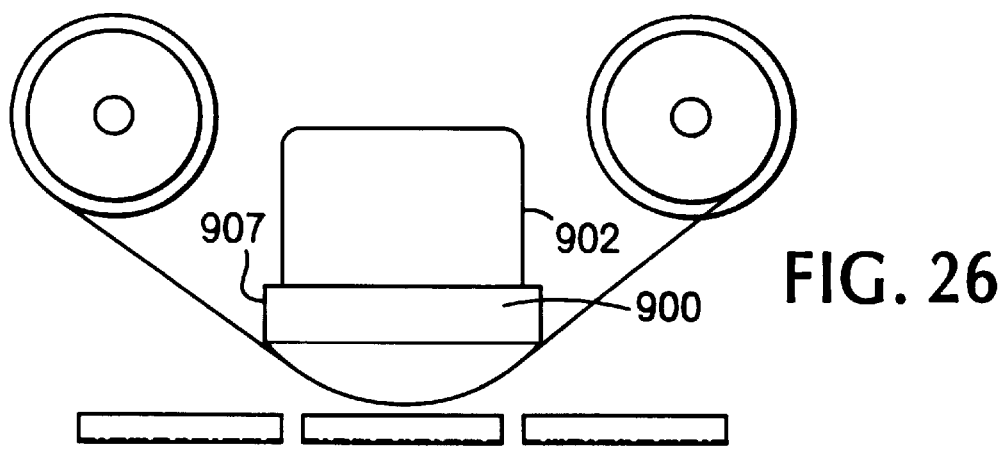
Figure 26A:
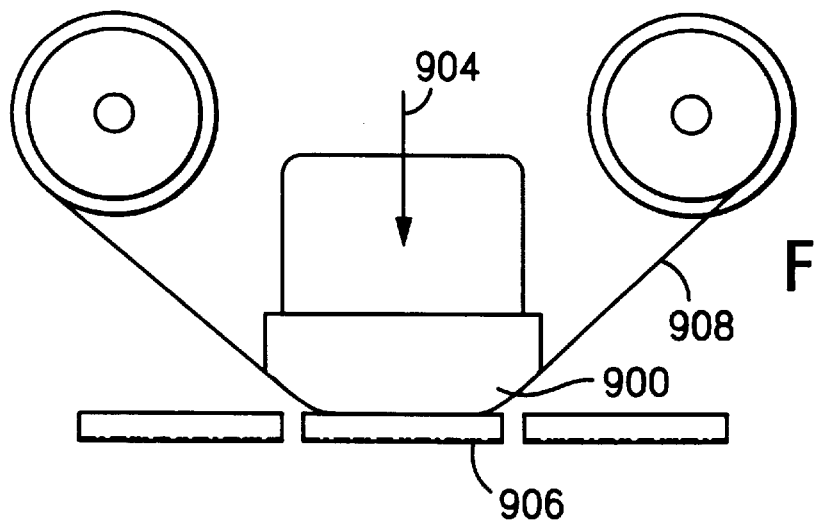

FIGS. 26 and 26a are side views of an alternative print head.

Figure 26B:
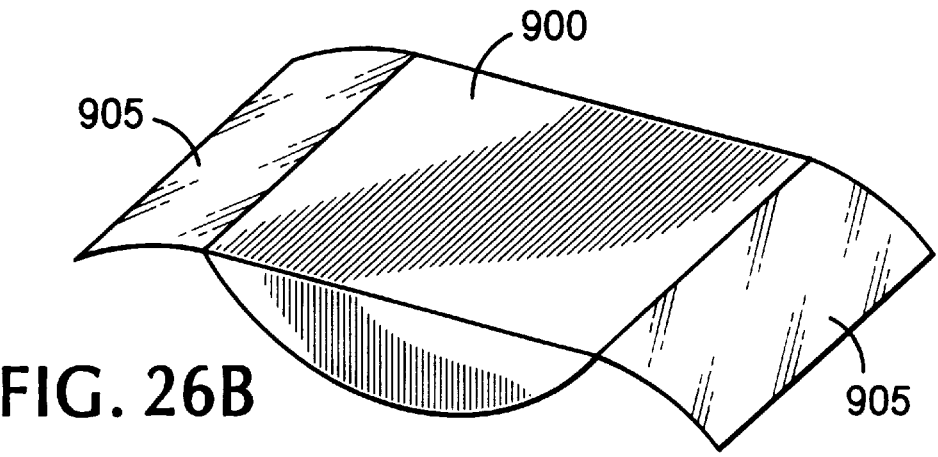

FIG. 26b is a diagram of the pillow of the alternative print head of FIG. 26.

Figure 27:
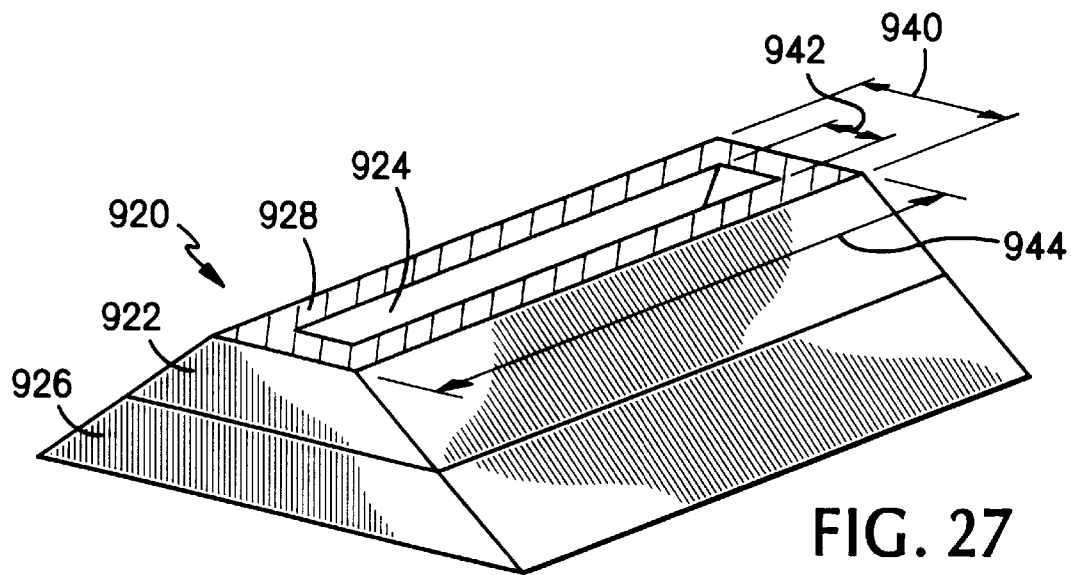

FIG. 27 is a perspective view of an alternative print head.

Figure 27A:
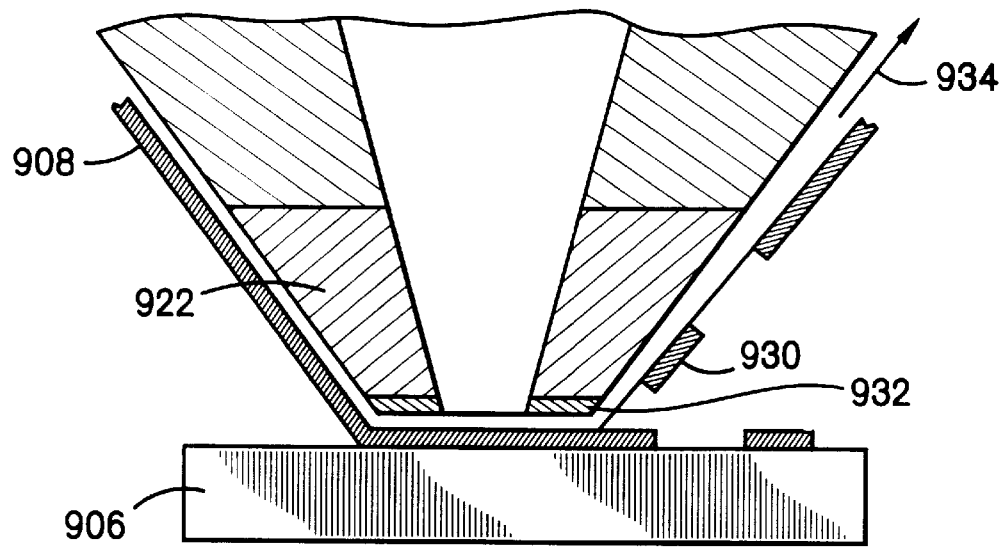

FIG. 27a is a cross-sectional side view of the alternative print head of FIG. 27.

Figure 28:
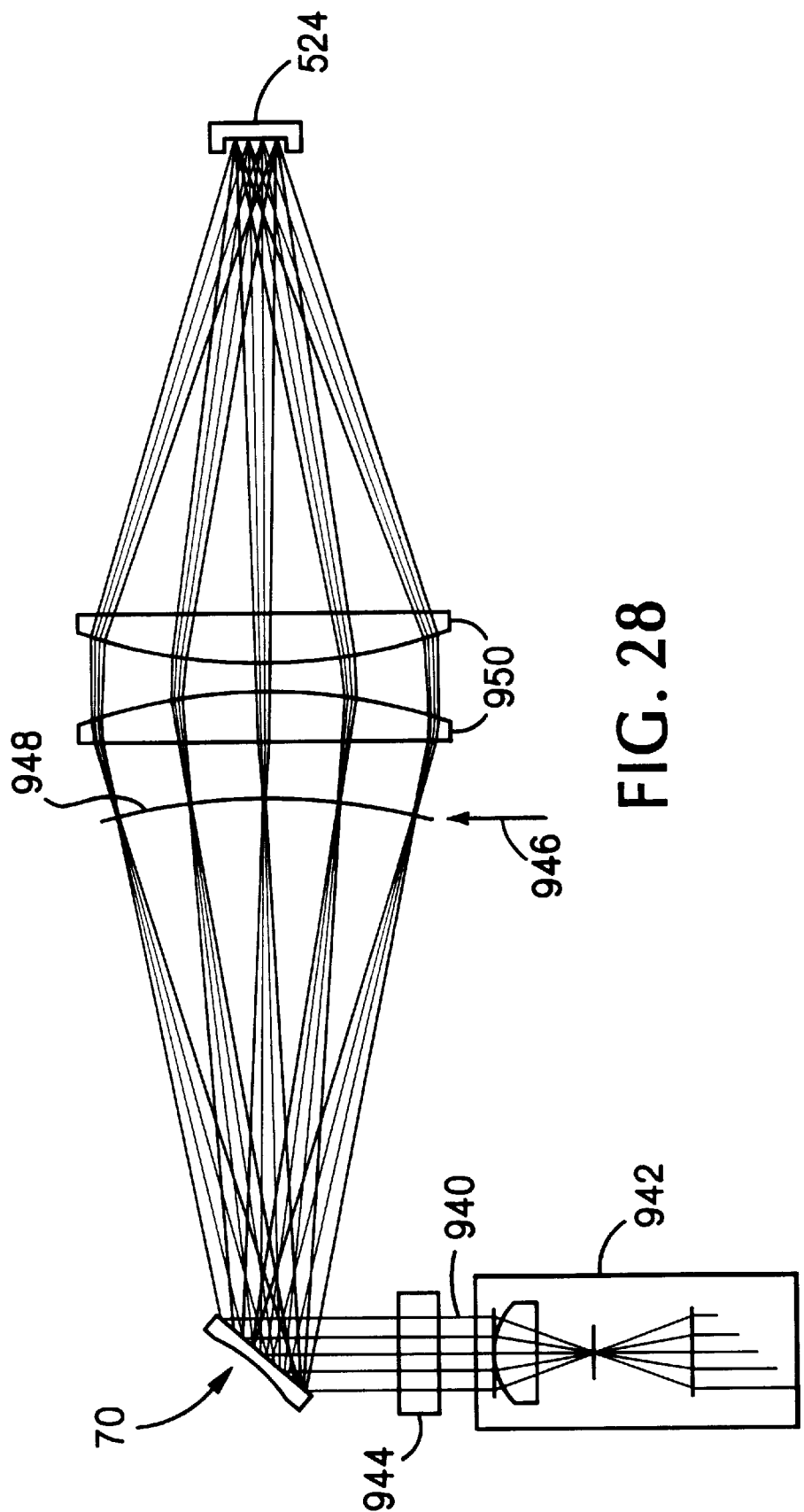

FIG. 28 is a schematic side view of an alternative scanner angle encoder.

In a scanned marking system 10 (FIG. 1) for marking three-color images 12 on the surfaces 14 of a series of integrated circuit packages 16 being stepped along a production line in a direction 20, a laser beam 22 is routed through a series of optical elements and ultimately through a print head 24 where it strikes print foils 25 to apply ink to the surfaces. (In FIG. 1, for clarity, the packages 16 are shown at a distance below the print head. During actual printing, the bottom of the print head is adjacent to, and the foil contacts, the surfaces of the packages.)

Laser beam 22 is a beam supplied from a relatively inexpensive 25 watt $CO_2$ laser 26. Beam 22 has a diameter of about 3 mm. In a beam splitter 28, the beam is divided into two beams at right angles to one another. One beam 30 is delivered to a power meter 32 which detects the power in the beam and delivers an output signal in a feedback loop to control operating parameters to keep the output power of the laser at a desired level (e.g., 25 watts). The second beam 34 is reflected at a right angle by a plane mirror and delivered through an acousto-optical deflector 38. The deflector is spaced along the optical axis of the system at a sufficient distance from the laser not to be within its near field (e.g., 8"). The deflector is capable of allowing the beam to pass through along direction 40, and of redirecting (switching) a portion of the beam to any one of at least three predetermined new directions 42, 44, 46 at high speed under control of a deflection input signal 48. The deflector is also capable of altering the amplitude of energy delivered by the beam by controlling what fraction of the beam is redirected in response to an amplitude signal 49. Although the figure shows three simultaneous output beams 42, 44, 46 for clarity, in operation there is a single beam which may be switched among the three paths shown.

When the beam passes in the unswitched direction 40, it strikes a beam stop 53; this is done when the deflection input signal 48 indicates that no pixel is to be marked. Switching the beam to any of the other directions 42, 44, 46 causes it to form a mark at a pixel location on a selected one of three of the integrated circuit packages located at one of three printing stations defined by the print head.

All paths leading from the deflector pass through a long focal length plano-convex lens 50. When the beam is directed along path 42, 44, or 46, lens 50 serves to focus the beam as a small spot on a corresponding one of three convex mirrors 52, 54, 56 at a distance of about 30" from lens 50.

The three mirrors are configured and mounted so that they respectively reflect the beam along one of three slightly divergent paths 58, 60, 62 causing it to strike a corresponding one of three concave mirrors 64, 66, 68. The convexity of each of the mirrors 52, 54, 56 causes the beam to diverge as it passes to the corresponding one of the mirrors 64, 66, 68. Mirrors 64, 66, 68 collimate the beam to a diameter of about one inch and direct the beam to a corresponding one of three planar mirror sections 70, 72, 74 of an oscillating machined aluminum scanner 76. Scanner 76 is driven to swing back and forth about an axis of a shaft by a brushless DC motor 78 operated so as to simulate a galvanometer scanner and controlled by a signal 80.

Each of the scanning mirror sections reflects the beam through a corresponding one of three focusing lenses 82, 84, 86 and into a corresponding one of three printing sections of print head 24. Each lens 82, 84, 86 is a flat field scanning lens. Lenses 82, 84, and 86 are custom designed for use at the wavelength of a $CO_2$ laser.

Other lasers could be used, for example, a YAG laser or a HeNe laser.

Three-Color Marking

Figure 1:
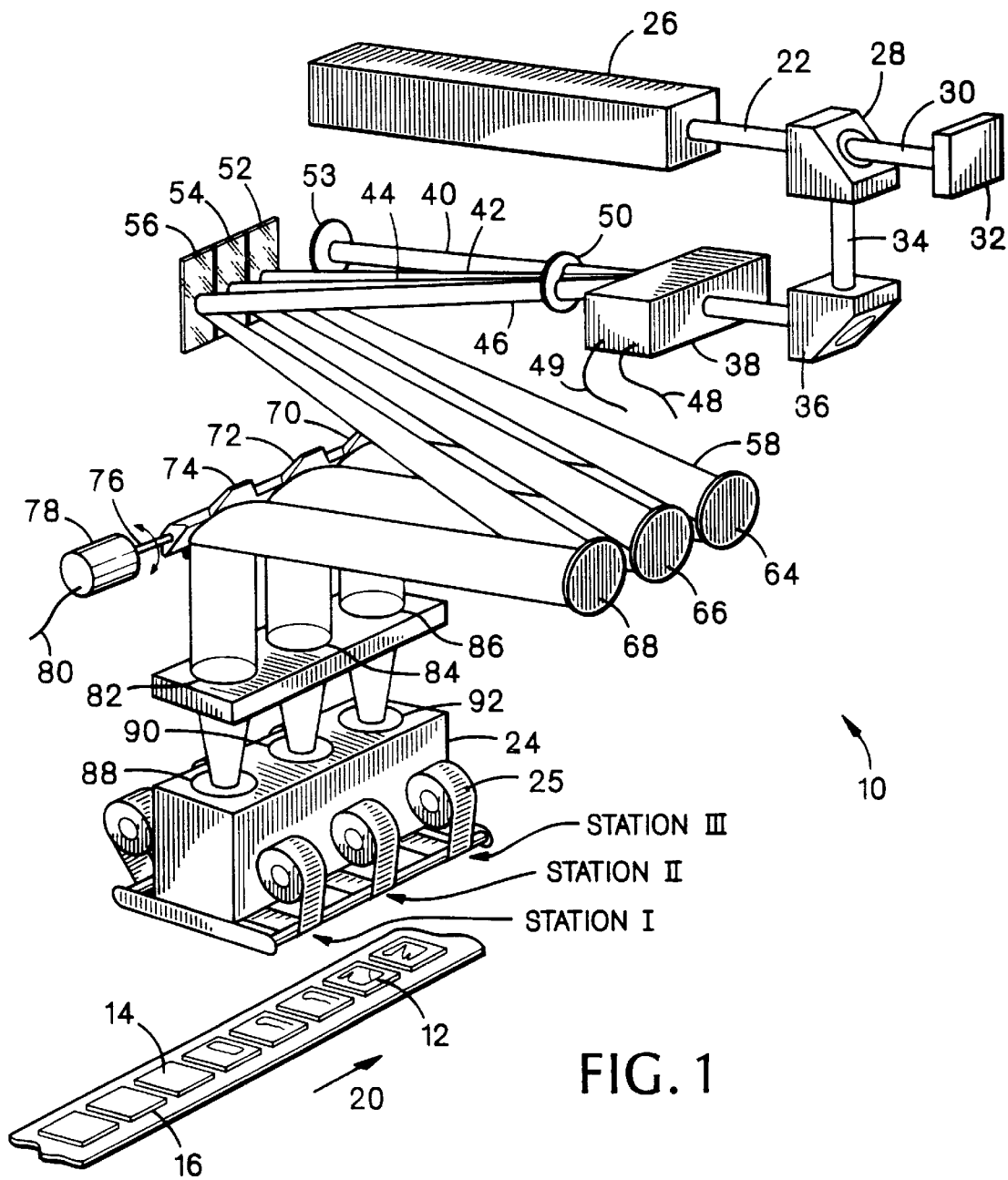
FIG. 1 is a perspective schematic view of a scanned marking system.

In a finished image 90 (FIG. 2) marked by the system shown in FIG. 1, each pixel location may have any one of three colors (A, B, or C) or may have no color. The pixels which are to be in color A are printed at station I, the pixels which are to be in color B are printed at Station II, and the pixels which are to be in color C are printed at station III. During printing, all three stations may be occupied simultaneously by surfaces to be printed. The printing of pixels at the three stations is interleaved.

A complete marking cycle for printing a full-color image on a surface includes three subcycles in which the surface successively occupies positions at the three stations I, II, and III. For example, in a first subcycle a surface 92 receives color A at station I (in the form of a partial print corresponding to color A), while a second surface 94 receives a color B at station II (in the form of a partial print corresponding to color B), and a third surface 96 receives color C at station III (a partial print for color C). In the second subcycle, surface 92 receives color B at station II, and so on. At the end of one complete marking cycle, one surface is fully printed with the three partial prints making a complete print 90, a second surface has two colors printed, and a third surface has one color printed.

Figure 2:
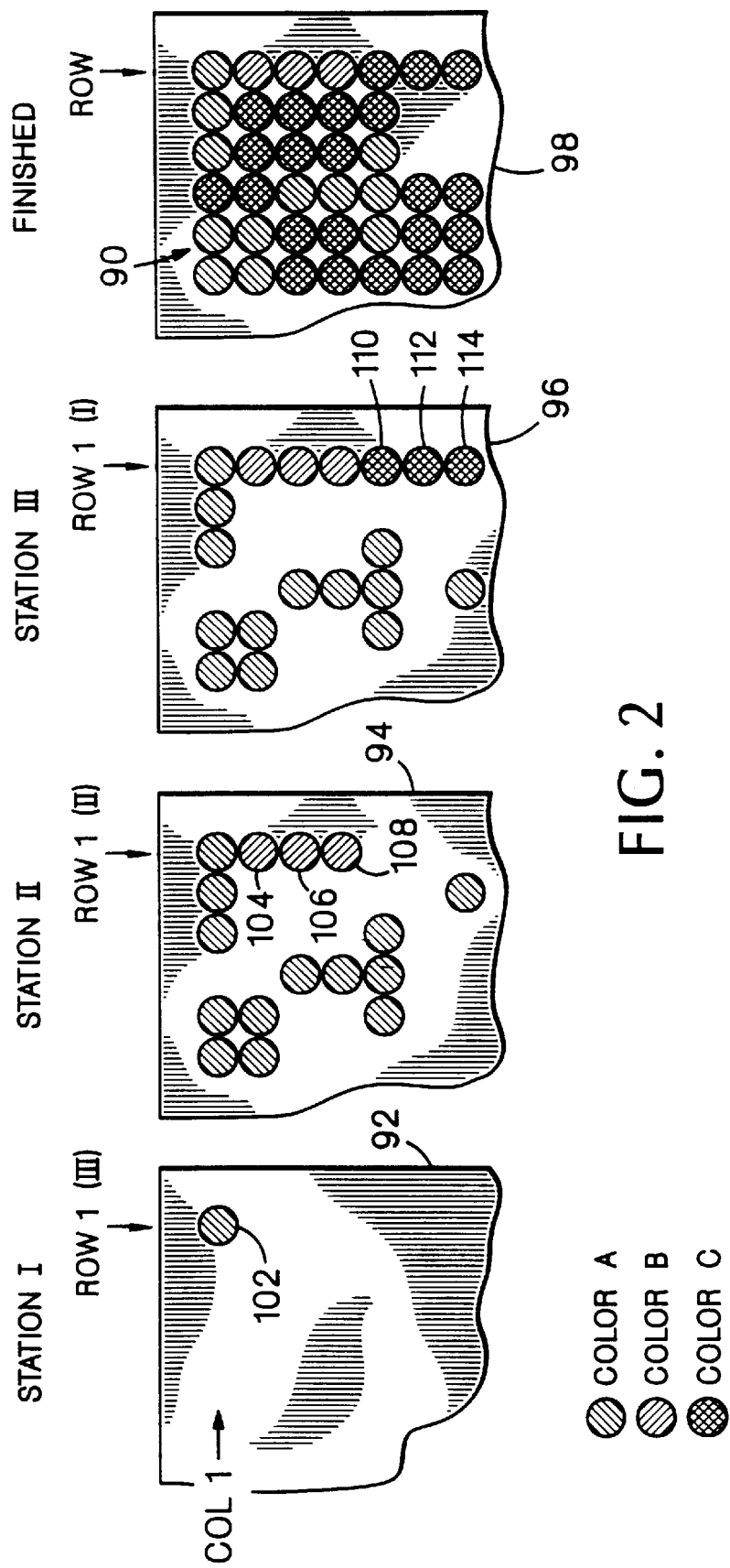
FIG. 2 is a schematic plan view of fragments of workpieces being marked.

Interleaved (parsed) printing of the three colors is achieved by control of the acousto-optic deflector. The scanning mirror causes scanning of the laser beam along a conceptual row of image pixels, e.g., row 1, beginning at the top of the Figure and progressing to the bottom. Each pixel of conceptual row 1 actually has three possible incarnations as a partial print pixel lying along one of the three rows—row 1(I), row 1(II), and row 1(III)—at the three stations. As the scanned beam reaches any of the columns (pixel positions) along the row, the acousto-optic deflector is capable of directing the beam to any one of the three stations so that the corresponding partial print pixel on that row may be printed. For example, pixels 102 through 114 are printed one after the other in the course of scanning row 1. The progress of the printing represented in FIG. 2 is the completion of only row 1. Also, in FIG. 2, for clarity, only fragments of the surfaces being printed are shown and they are spaced closer than would be possible in the actual system. Surface 98 shows all of the printed pixels of the image fragment.

Alternative Optical Configurations

In an alternative scheme, focusing lenses 88, 90, 92 are diffractive scan lenses. Referring to FIG. 17, in this scheme, collimated input light 808 at 10.6 microns incident at a fixed angle on scanning mirror 70 is reflected by mirror 70 and the still collimated light strikes a diffractive surface 812 of a diffractive scan lens 810 (available from OFC-Diamond Turning Division, Keene, N.H.) (only one of the three lenses used in system 10 being shown). Diffractive surface 812 focuses the light through a zero-power substrate 814 of scan lens 810 and through a ZnSe plane-parallel pressure window 818 (available from II–VI Inc., Saxonburg, Pa.) to an image plane 820. Pressure window 818 provides a seal between the optics and the foil in a print head to allow for positive air pressure against the foil. The foil tension can then be adjusted for optimum ink transfer from the foil when printing. Scanning mirror 70 is nominally oriented at 450 (position 809) to the incoming light. After reflection, the light is directed at 90° to the incoming light and parallel to the optical axis of diffractive scan lens 810 and is focused by diffractive scan lens 810 at a spot 822 in image plan 820.

At other angular positions of scanning mirror 70 (four positions 824, 826, 828, 830 being shown in FIG. 17), the reflected light is incident on scan lens 810 off the optical axis. These positions give rise to off-axis beams and image plane spots 832, 834, 836, 838, respectively.

Each beam is focused to a field point in the image plane whose position is given by $y=F_x e$; where y is the off-axis distance, $F_x$ is the scan lens focal length and $\ominus$ is twice the angular deviation of scanning mirror 70 from its nominal 45° orientation.

The single element diffraction scan lens 810 thus yields a scanned image on a flat field with the position of the image point linearly proportional to the angle of scanning mirror 70. The geometrical spot shapes and sizes on-axis 840, 9.45° off-axis 841, and 13.5° off-axis 842 are shown in FIG. 18. The fractional energy as a function of spot radius is shown in FIG. 18a. As can be seen in the Figures, diffractive scan lens 810 produces uniform diffraction limited spot profiles across the scanned image. FIG. 18b shows the effect of focus shift on the geometrical spot size for on-axis 843, 9.45° off-axis 844, and 13.5° off-axis 845 spots. A negative shift is in the direction of arrow 846 (FIG. 17) and a positive shift is in the direction of arrow 847.

Advantages of the single diffraction scan lens over methods using a series of conventional ground and polished spherical lenses include less fabrication and alignment, a smaller, lightweight structure and better spot uniformity.

An additional alternative scheme is shown in FIG. 19. Here, the light source (not shown) is a diode laser at a wavelength between 970 and 980 nm. The diode laser is about 4–5 times more efficient than $CO_2$ and YAG lasers. The light is delivered by a 0.40 numerical aperture circular fiber optic cable 850. The light diverges from cable 850 and is collected and collimated by a single, molded, glass aspheric lens 852 (available from Geltech, Alachua, Fla.) to a diameter of approximately 5.0 mm. This collimated light is incident on scanning mirror 70 at a fixed angle. Scanning mirror 70 rotates causing the collimated beam to scan in an angular fashion about the pupil of a focusing lens 854 (available from Opticraft, Woburn, Mass.). The focusing lens 854 intercepts the collimated beam and forms focused spots in the focal plane or image plane 820 via mirror 856. Scanning mirror 70 is aligned with the pupil of scan lens 854 to avoid vignetting and pupil shifting.

The diode laser source is modulated by switching the diode drive current to a desired power level just below threshold. In this way, a dot is formed at the scan lens focus whenever the diode source is turned on.

A fold mirror 856 is shown between scan lens 854 and focal plane 820. Fold mirror 856 is employed when optics 852, 70, and 854 are mounted in a horizontal plane and the print beam is deflected down onto the top of the part to be printed.

The geometrical spot shapes and sizes on-axis 858, 9.45° off-axis 859, and 13.5° off-axis 860 are shown in FIG. 20. Minor amounts of spherical aberration and astigmatism are present off-axis but the spot diagrams are still well within the desired diffraction limit for 500 dots per inch printing. FIG. 21 shows the relative irradiance along two superimposed orthogonal axes (x, y) for on-axis 861, 9.45° off-axis 862, and 13.5° off-axis 863. As can be seen, most of the energy is concentrated within the required 50 micron (0.002") diameter needed for 500 dots per inch printing. The irradiance profiles of FIG. 21 representing the spot profiles are only very slightly dependent on the distributions shown in FIG. 20. This is because the system is diffraction limited such that the geometrical errors, as shown in FIG. 20, are very small.

Advantages of this system include direct modulation of the diode laser source requiring no external modulators and auxiliary optics; air cooling of the diode laser source requiring no closed loop water chillers; a small compact size permitting a print head/engine that fits easily into a small package, is lightweight and easily translatable; a simple optical system for scanning and beam delivery since the diode laser wavelength allows for a high F/no. reducing the requirements on the scan lens, permits inexpensive and ordinary glass materials to be used for the optics, and produces high optical efficiency since the glass optics are essentially non-absorbing in the near IR wavelengths.

The near infrared wavelength of the diode print beam of FIG. 19 is close enough to the visible region that an optical system can be designed that delivers print energy at a near IR wavelength and cure energy at a visible wavelength simultaneously to the foil.

Referring to FIG. 22, collimated print light 88, e.g., from cable 850 as described above with respect to FIG. 19 or directly coupled from collimating optics, and collimated cure light 880, e.g., visible red light at 670 nm generated from a diode laser source that is either coupled directly to collimating optics or fed by a fiber optic cable, are combined by a dichroic beam combiner 882. Beam combiner 882 has a dielectric bandpass filter coating designed to reflect nearly 100% of light at wavelengths above 800 nm while transmitting those below 800 nm. The 975 nm print beam is reflected from beam combiner 882 to 90° from its incoming angle while the collimated red cure light passes through.

Both collimated beams 884 are now collinear and superimposed. Both beams 884 are then reflected off scanning mirror 70. Rotation of scanning mirror 70 causes collimated beams 884 to scan in an angular fashion about the pupil of an achromatic scan lens 886 (available from Opticraft). The scan lens intercepts the collimated beam 884 and forms focused spots 888 in the focal plane or image plane 820. A fold mirror 856 is shown between scan lens 886 and focal plane 820.

Focusing lens 886 has the same focal length for wavelengths between 970 and 980 nm and for 670 nm ensuring that both light beams will focus in the same longitudinal and transverse planes. The cure light is superimposed on the printed dot at essentially the same time and instantly cures the ink as soon as the ink is melted.

Referring to FIG. 23, achromatic scan lens 886 is fabricated from two different glasses 890, 891 to achieve achromatization. Glass 890 has positive power and is, for example, SK16, a crown glass having high dispersion. Glass 891 has negative power and is, for example, SF6, a flint glass having low dispersion. The combination of the positive and negative powers coupled with the different dispersions produces an achromatic lens 886 having the desired power, and thus focal length, and essentially no dispersion at the selected wavelengths. The two glasses (available from OptiCraft) are cemented together which has the advantage of low fabrication costs and ease of alignment. The lens includes one plane surface 892. The two glasses are of common material and easily worked.

Figure 24:
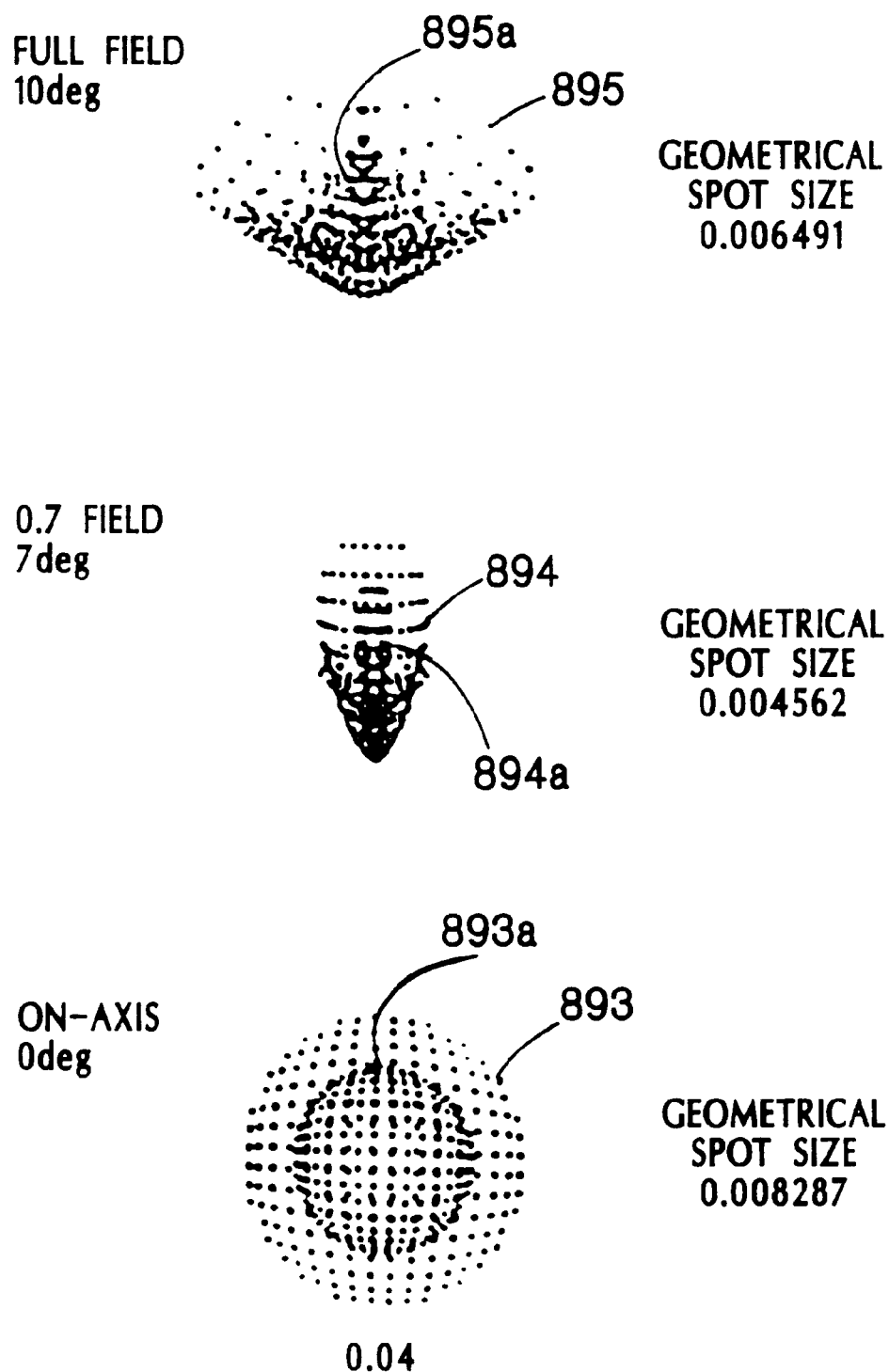
Figure 24A:
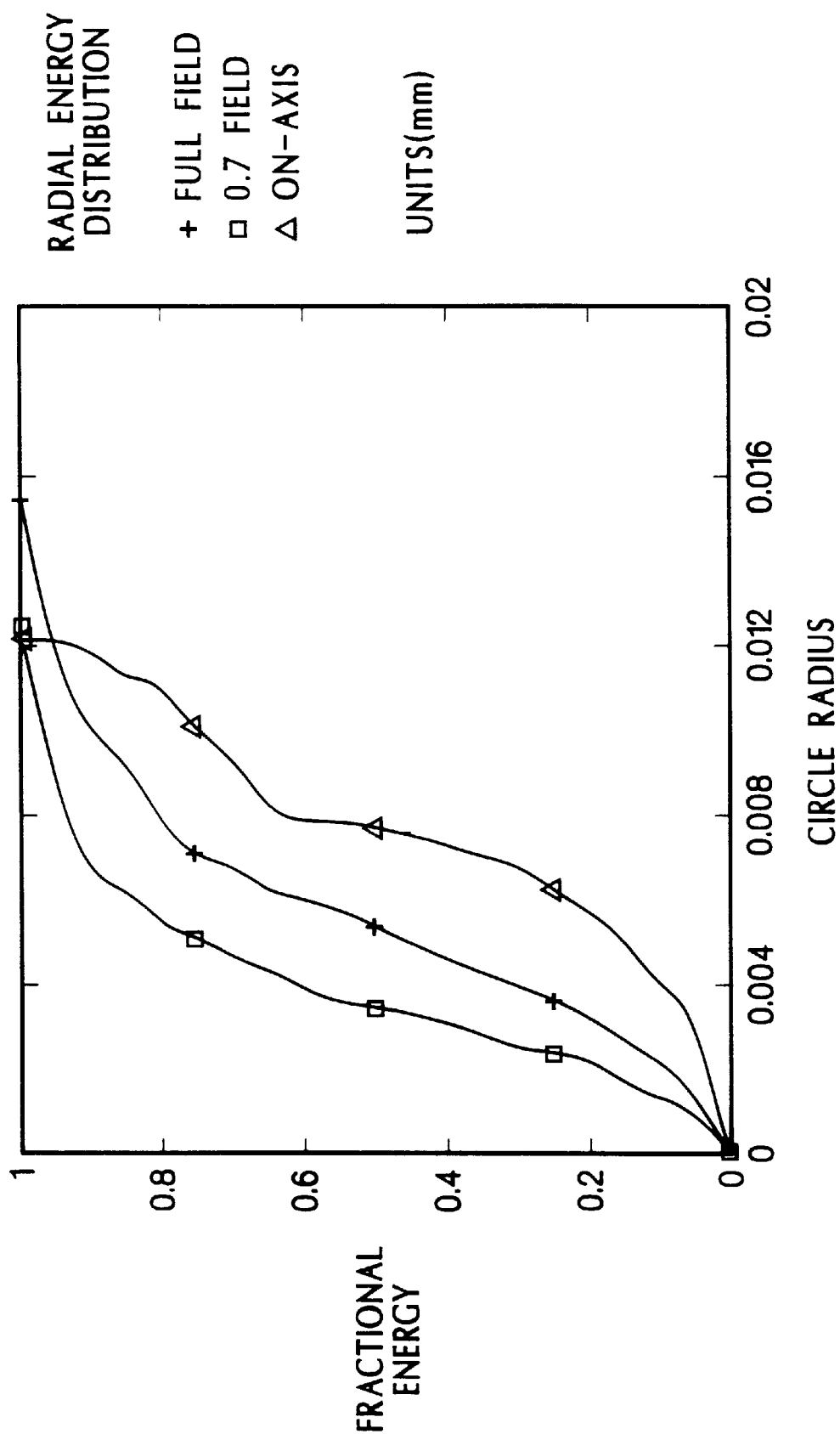

The geometrical spot shapes and sizes for marking on-axis 893, 9.45° off-axis 894, and 13.5° off-axis 895, and for curing on-axis 893*a*, 9.45° off-axis 894*a*, and 13.5° off-axis 895*a*, are shown in FIG. 24 and the fractional energy as a function of spot size radius for marking is shown in FIG. 24*a*. The cure light spot is contained completely within the 50 micron diameter of the print spot across the scan plane.

Figure 24B:
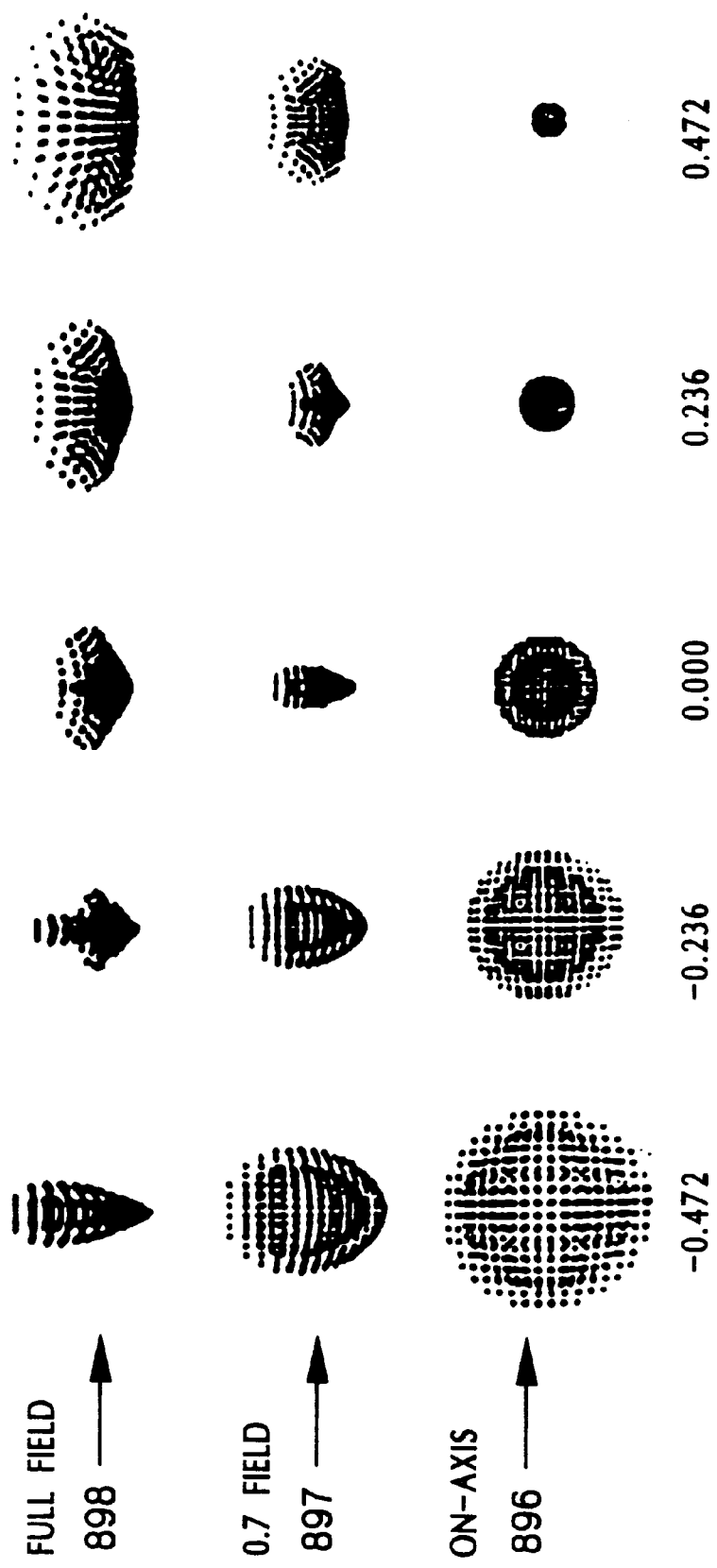

FIG. 24*b* shows the effect of focus shift on the geometrical spot size for on-axis 896, 9.45° off-axis 897, and 13.5° off-axis 898. A negative shift is in the direction of arrow 899 (FIG. 23) and a positive shift is in the direction of arrow 899*b*.

Figure 25:
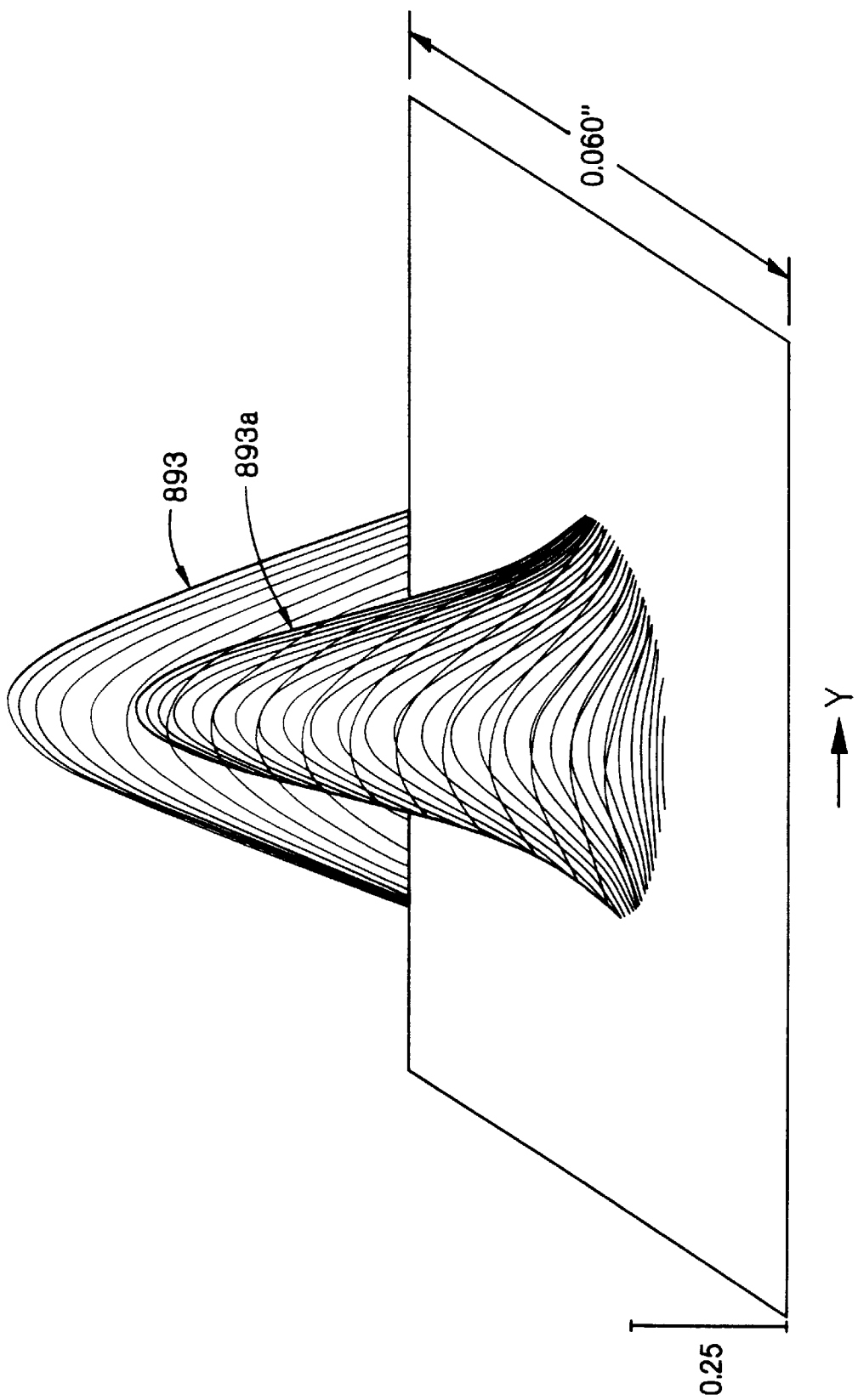

Minor amounts of spherical aberration and astigmatism are present off-axis but the spot diagrams are still well within the desired diffraction limit for 500 dots per inch printing. FIGS. 25–25*b* show the relative irradiance along the radius of spot diameter for on-axis 893, 893*a*, 9.45° off-axis 894, 894*a*, and 13.5° off-axis 895, 895*a*. As can be seen, most of the energy is concentrated within the required 50 micron (0.002") diameter needed for 500 dots per inch printing.

An advantage of the print/cure system is its small, compact size and efficiency. Additionally, the curing process does not add extra time to the printing process.

Scanner Anaular Position Encoder

To assure that the pixels marked along each scan line on the workpiece are evenly spaced and accurately positioned, a low power (1 to 3 milliwatts) secondary laser (HeNe or diode laser, preferably visible) beam 510 (FIG. 3) is reflected from the flat mirror surface of the middle mirror element 72 of the scanning mirror (FIG. 1; but for clarity the position encoder is not shown in FIG. 1). Another mirror surface (for example, one at a different angle) dedicated to use by the encoder could be used instead.

As the scanning mirror swings 512 (through an angular range of + or −3.183 degrees on either side of a central angular position) to reach successive pixel locations along the scan line, a focused version 514 of the beam scans back and forth 516 across successive parallel rulings 518 formed on a transparent substrate 520 (also shown head on at the top of FIG. 3), and is then projected onto a wide aperture (0.250 inches diameter) light detector 524.

The widths of the rulings compared to the diameter of the focused reflected beam are appropriate to assure that the detector output signal 526 will indicate when each line is passed. The number of rulings is at least as large as the number of pixels to be placed along a scan line and their spacing is representative of the spacing of the pixels along the scan line. During setup, the position of the ruling substrate is set so that at the moment when the focused reflected beam crosses the first ruling, the first dot position on the scan line on the workpiece is reached.

During scanning, output signal 526 provides an indication for each ruling that is crossed. The output signal 526 is fed to the DMA controller portion 610 of processor 120. When each pixel position is reached, signal 526 causes the DMA controller to fetch an associated image byte which determines whether marking is to occur at that pixel site; if so it signals the deflector to direct the pixel to be printed at the desired surface (color) 92, or 94, or 96 (FIG. 2). In this way, the marking of dots along the scan line is triggered simply and accurately based on a light beam reflected from the same surface (or at least a mirror surface fabricated on or affixed to the same structure) which reflects the marking beam.

Figure 3:
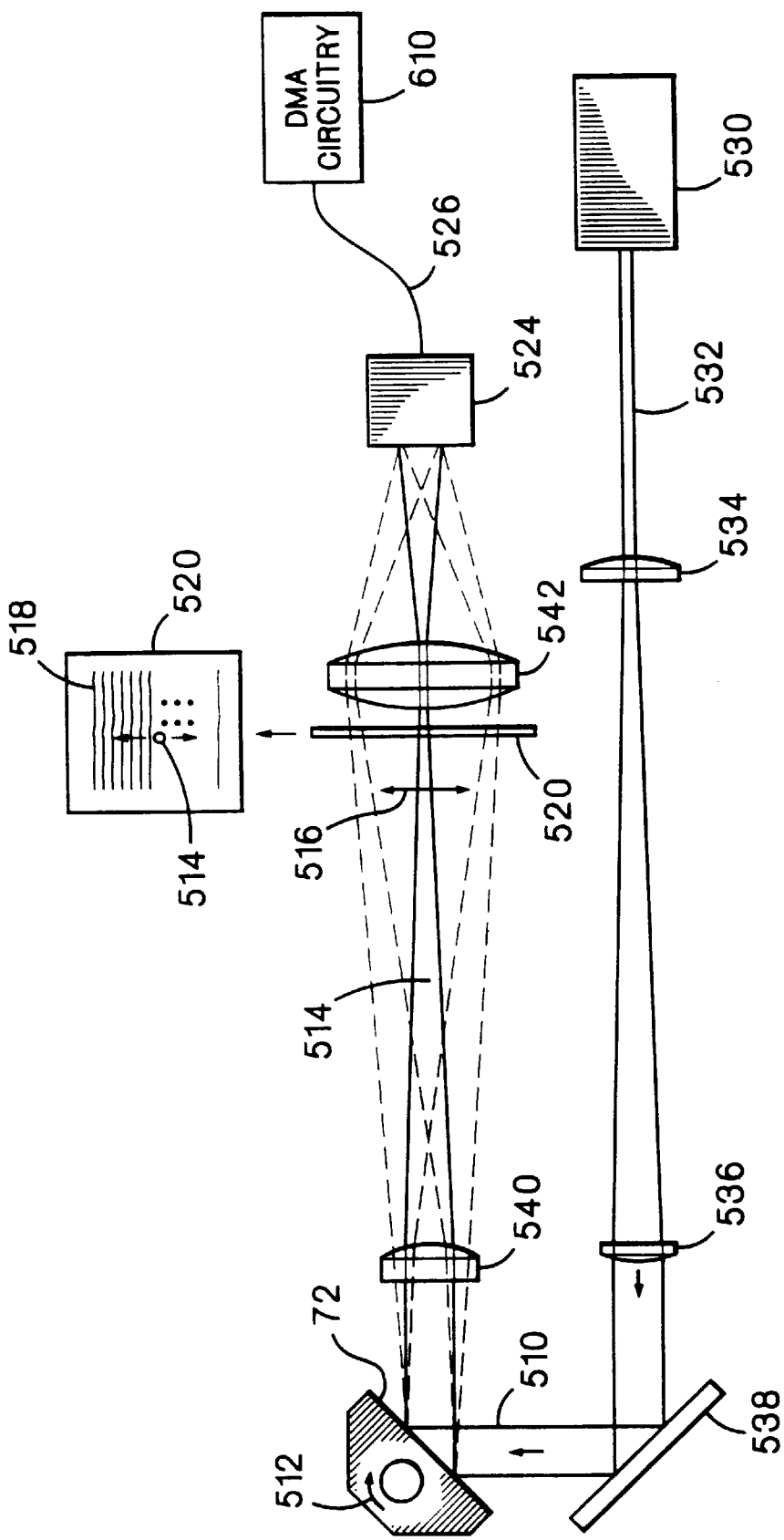
FIG. 3 is a schematic side view of a scanner angle encoder.

In FIG. 3, beam 510 is originated from a He—Ne laser 530. Its output beam 532 is routed through a beam expander 534 and a collimating lens 536. The resulting beam has about a ½-inch spot size and is then reflected from a plane right angle mirror 538 onto the scanning mirror. The reflected beam from the scanning mirror is passed through a focusing lens 540 which focuses it on the ruling substrate. The beam that emanates from the ruling substrate is defocused and aimed at the detector by a lens 542. As indicated in dashed line, when the scanner is at the upper end of its stroke beam 14 is aimed near the top of the ruling substrate. As the scanner sweeps through its full range, beam 14 is swept across the ruling substrate. Lens 542 redirects and diffuses the beam in such a way that a single wide aperture detector continues to receive the beam as the scanning mirror is swept through its full range.

An alternative implementation of the position encoder is shown in FIG. 28. A collimated beam of light 940 at 635 nm from a diode laser 942 is incident on-axis to a single plano-convex glass lens 944. Lens 944 focuses the light towards a focal point along a plane 946. Scanning mirror 70 intercepts the light between lens 944 and focal plane 946 forcing the focused spot to sweep out an arc along focal plane 946 with a radius equal to the distance between scanning mirror 70 and focal plane 946. The position of the focused spot along focal plane 946 is linear and given by the product of sweep angle and sweep distance. A curved ruling 948 (available from Phototool Engineering, Inc., Chelmsford, Mass.) is placed along focal plane 946 producing a linear scan of the spot corresponding to the position of scanning mirror 70. Light passing through ruling 948 is relayed to photodetector 524 by a relay lens pair 950. Lens pair 950 reimages the light onto the photodetector such that vignetting and thus signal variations during scan are avoided.

Advantages of the encoder include providing a linear scan regardless of whether the mirror rotation is linear. The encoder measures the mirror rotation directly and accurately. There is no ambiguity over errors caused by methods involving indirect measurement. It is also fast and measures the motion in real time. The focusing lens is used on-axis only so an inexpensive, readably available lens can be used.

There is nothing placed between the scanning mirror and the ruling to corrupt the light path and therefore the motion of the focused spot on the curved ruling is perfectly linear.

Controller (Processor)

Figure 4:
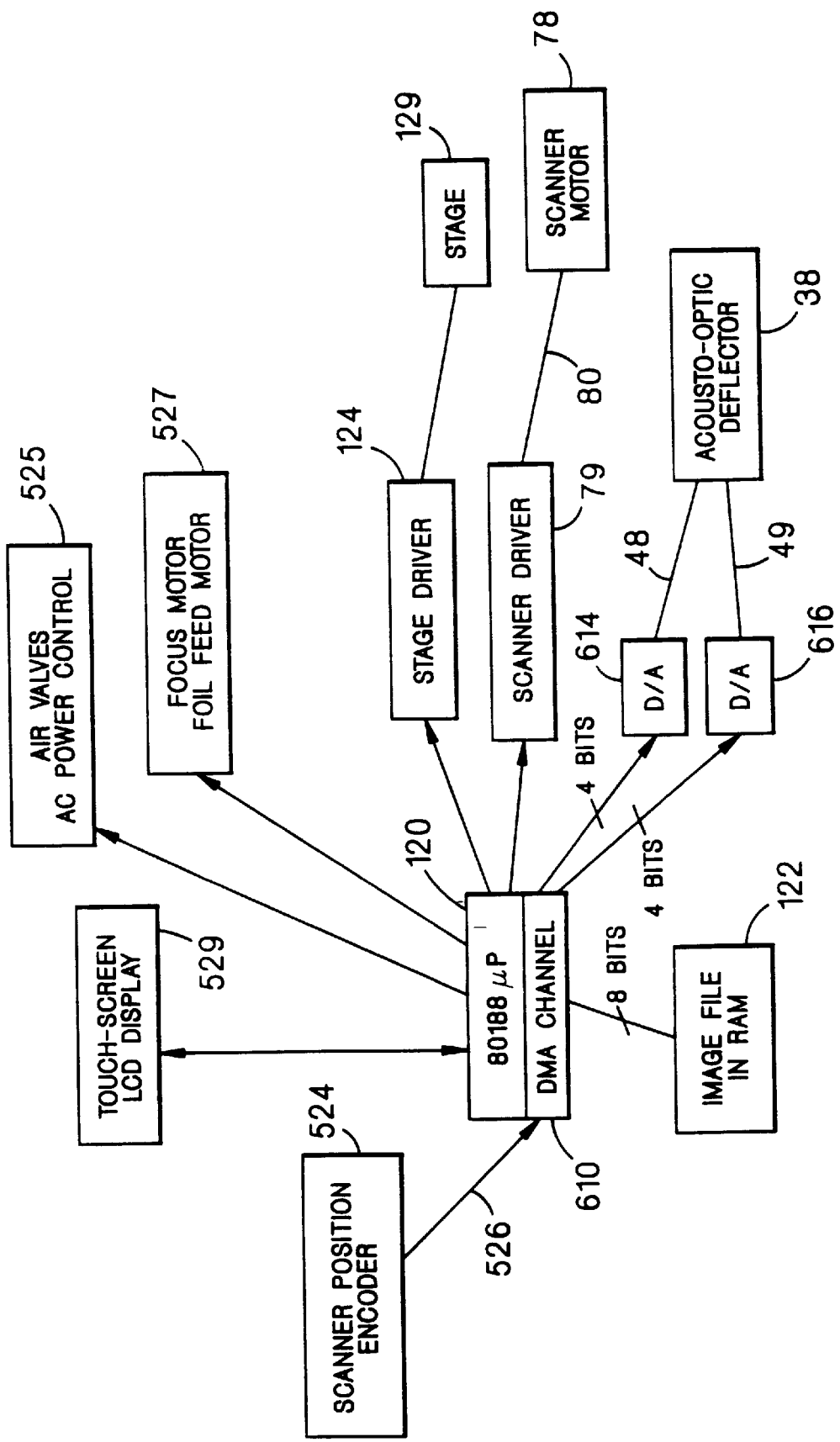
FIG. 4 is a block diagram of control circuitry.

The coordination of the elements of the system is performed by a controller (processor) 120 (FIG. 4). An image file 122 stored in RAM contains information sufficient to specify the colors and intensities of each of the pixels in the image to be marked. The computer controls a stage driver 124 to cause motion of a stage 129 on which the workpieces are mounted. The stage 129 is controlled both to cause large motion to relocate the workpieces at the successive printing stations after each marking sub-cycle, and finer scanning motion to move the workpieces row by row during marking. (Alternatively, the print head containing the scanning mirror and other downstream optics can be scanned along a stationary workpiece.) The controller also controls the scanner driver 79 to cause the scanner to swing back and forth along each of the rows of the image. By coordinating the stage driver and the scanner driver, the controller is able to cause the laser beam to raster scan all of the pixels of the image. By also controlling the acousto-optical deflector 38, the controller is able to parse the image pixels into partial prints by directing the beam to any of the three printing stations or to no station in order to print at each pixel the intended color or no color, as indicated in the image file.

The first pixel of a scan line is marked on a workpiece at the time when the scanner causes the measuring beam to reach the first ruling on the substrate. In the case of a 300-by-300 pixel image, when the 300th ruling is crossed by the measuring beam, the controller triggers the scanning mirror to reverse its motion and re-position itself to begin the next scan line. When the 300th scan line is completed, ending a marking subcycle, the controller halts the scanning process, re-positions the workpieces at their new stations and restarts the scanning.

Image file 122 is a .TIF format file and is held in a form of RAM for use during marking. The RAM may be an EPROM or SRAM (e.g., PCMCIA card) or other fast access memory, i.e., flash or D-RAM. The .TIF file data is arranged to represent the color and intensity to be marked at each pixel in the 300-by-300 pixel image field. The encoder signal 526 is routed to the DMA circuitry 610 of the control processor. As the signal indicates the arrival of the encoder beam at each successive pixel location along the scan line, the DMA circuitry causes a direct memory access of the pixel color (deflection of the beam) and intensity from the RAM. The DMA channel contains its own addressing circuitry and may run independently of any CPU involvement except for the initial setting of the channel's control words. During the encoder's deadband time, the CPU sets up the DMA control words to start on the first encoder transition signal 526. By deadband we mean the time beginning when the scanned beam, during its retrace, just passes the first ruling and ending when, at the beginning of the next forward trace, the scanned beam just reaches the first ruling. At the beginning of a new scan, the encoder transition is deglitched to insure validity and then triggers a DMA request to transfer the first image byte from EPROM or PCMCIA memory into dual D/A converters 614, 616. The high order four bits of the byte (the deflection information) are sent to one D/A converter and the low order four bits (the amplitude information) are sent to the other D/A converter. The outputs 48, 49 of the two D/A converters are respectively fed to the deflection and amplitude ports of the acousto-optical deflector 38.

Each encoder transition signal 526 resets a predetermined CPU timer value. When the timer expires, the D/A amplitude channel is reset. This in effect controls the pixel "on time" or dwell. The DMA channel expects to receive the appropriate number of transitions for each scan line. Upon detecting the last pixel in the scan line the channel automatically shuts down and waits until its control word is reinitialized for the next scan line after scanner retrace.

The .TIF file contains 8-bit pixel values each of which is capable of specifying 256 colors. The .TIF file is generated by, e.g., Photo Finish (a software package available from ZSoft Corp, of Marietta, Ga. which runs under Microsoft Windows). The file's tag fields contain the necessary information defining the image's pixel density (dots/inch), and line and column sizes. The image file is uncompressed and presented to the marking control computer on the EPROM or PCMCIA memory card.

A palette is defined for use in encoding pixels in the .TIF format. The standard TIF palette is a 16-by-16 matrix; each entry in the matrix is a pointer to a color value in a color table. This arrangement is modified for use in driving the scanned marking system. Photo Finish offers the user the capability of editing the color palette. Here the color palette is edited to include all blank cells except for four cells. One of the non-blank cells is used to represent nonprinted color, and the other three to represent print colors. For example, if the three print colors are red, white, and blue, the palette would be configured to represent the non-print color (black) by cell 00 (hexadecimal), red by cell 3f (hexadecimal), blue by cell 9f (hexadecimal), and white by cell ff (hexadecimal). No other cells would be used. The eight-bit value in each of the four cells is specially encoded. The high order four bits of the value is used to determine deflection information. The lower order four bits represent amplitude and control the amount of laser energy delivered, or may be used to print the desired color in grey scale by using an ink medium which is sensitive to grey scale information and an associated grey-scale image file and palette.

The control processor 120 (an Intel 80188) also controls airvalves and AC power 525, servo and stepper motors 527, and a touch screen display 529 for production worker interaction.

Marking begins when the CPU starts the laser scanner. All marking functions are slaved to the laser scanner cycle (approximately 90 Hz). Some dummy scans are performed to stabilize the scanner before marking scans are performed. There are two rules which should not be violated. One rule is that at least the same number of encoder transitions as pixels per scan must be received (this may require mechanical adjustment). The second is that the encoder must be in the deadband at a specified time, i.e., with no encoder transitions occurring during the deadband.

Print Head

Figure 5:
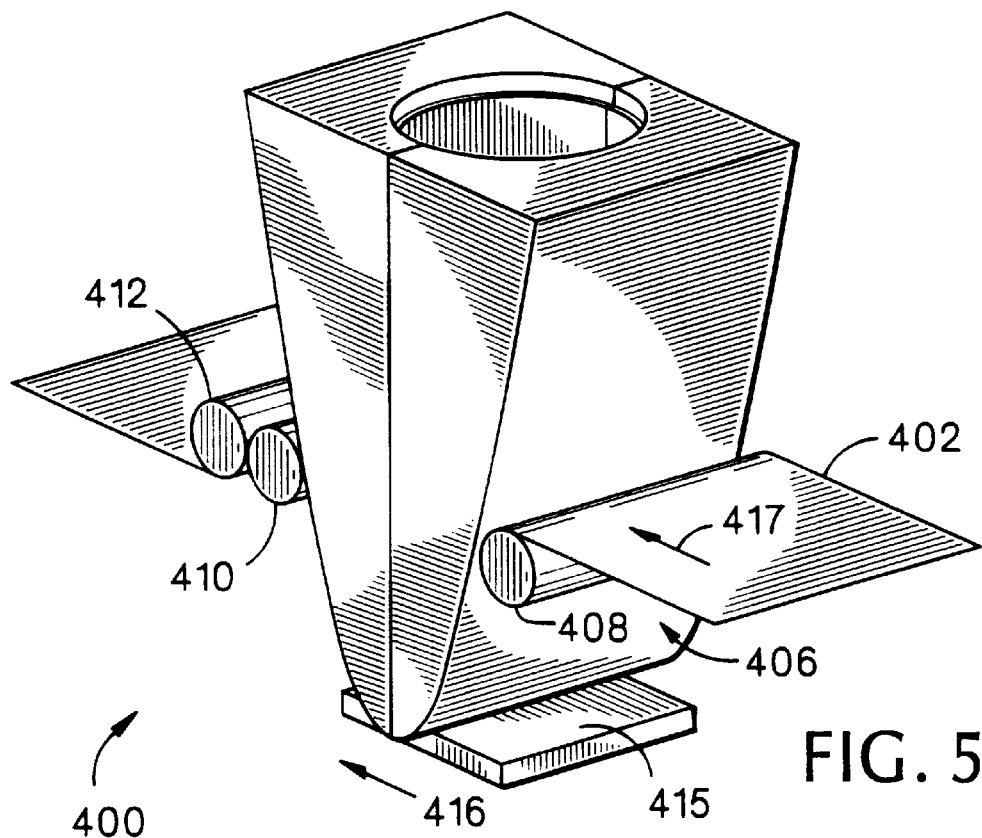
Figure 6:
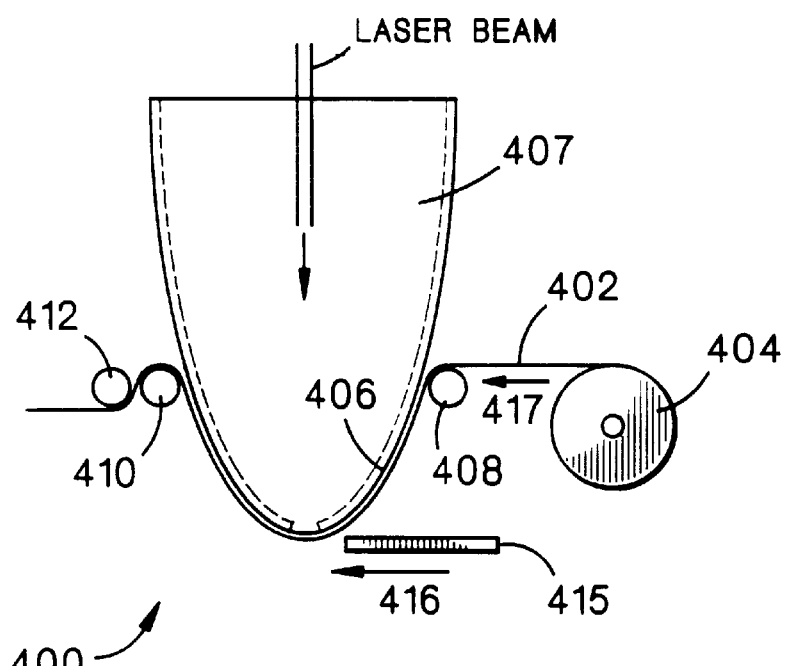
Figure 7:
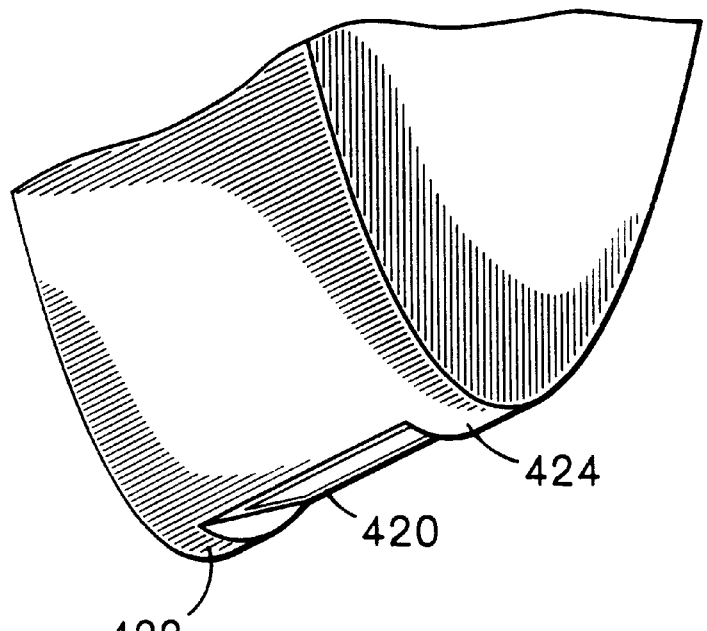

Referring to FIGS. 5 and 6, in one version of a print head 400 for each print station, the foil 402 is delivered from a supply roll 404 with the ink side down and pulled against a parabolic surface 406 of a hollow pressurized chamber 407 by an idler roller 408. Tension is provided by applying a torque to the hub of supply roll 404. The foil then is drawn over and conforms in contour to the parabolic surface, eventually reaching a pair of outfeed tension rollers 410, 412, and from there a take up roll (not shown). As the workpiece 415 to be marked is moved in the direction 416 during scanning, the foil is fed in direction 417 at the same or nearly the same velocity as the workpiece. Using a slightly different velocity has the advantage of setting up small shear forces at the interface between the foil and the part, which may improve the print quality. As seen in FIG. 7, the apex of the parabolic surface of the print head has an aperture 420 which extends across the print head leaving parabolically contoured bordering sections 422, 424, which maintain the contour of the foil.

Figure 8:
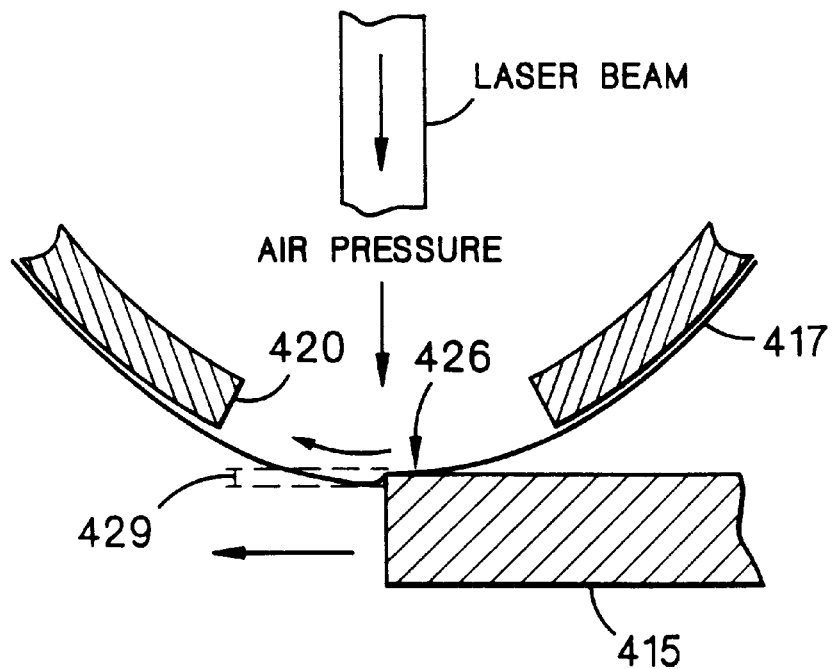

As seen in FIG. 8, when the leading edge of workpiece 415 reaches the foil it causes the foil to contact the top surface of the workpiece along a small region 426 which runs linearly across the print head (into the page). At the same time, air pressure from within the hollow print head chamber presses the foil against the part. Tension on the foil (imparted by the supply roll) balances the force exerted by the air pressure. The air pressure in the head may be at any level up to the equivalent pressure provided by the tension of the foil over the curved head. As the workpiece moves along to the left, the limited linear contact area 426 moves across the top surface, with the foil being peeled away shortly after it first makes contact with the surface. The laser marking occurs along the scan line along the linear contact line between the foil and the top surface.

There is a controlled time between the scanning of a line and the stripping of the foil from the workpiece along that line, and the contact time is constant for all scan lines. This improves the uniformity of the printing. Because the foil is stripped continuously at a relatively narrow strip line, the peak strip force is reduced and the workpiece does not need to be held. Because the area of contact between the foil and the workpiece is small, the amount of force required to hold the foil against the workpiece is small. No metal parts contact the workpiece; only the foil does.

This version also has disadvantages. The head must extend below the surface of the workpiece on either side, which makes it difficult to print workpieces held in trays. The scheme requires uniformity of workpiece height because the vertical interference (429 in FIG. 8) between the workpiece and the foil is on the order of only 0.005 inches to 0.020 inches. One possible solution to this disadvantage would be to make the head the same width as the workpiece but form the head of compressible rubber. With multiple printing stations of different colors, the routing of the foils to avoid interference with one another also must be addressed.

Referring to FIGS. 9, 10, and 11, in an alternative print head 430, foil 432 is fed over a contoured edge 434 of a wall 436 of a hollow pressurized (0.5 to 5.0 psi) chamber 438, past a rubber sealing flap 440, past a foil guide 442, across an opening 444 which is broad enough to span the entire image, past a second foil guide 446, a second rubber flap 448, and a second contoured edge 450. Opening 444 is defined in a window 449 which has two contoured surfaces 445, 447 that support the foil. Prior to workpiece 452 being moved into contact with foil 432, the portion of the foil the spans the opening 444 has a convex curved contour formed in it by the internal air pressure in the head. As the workpiece is moved toward the head, the first contact is made at the center point 454, and the area of contact then spreads outward. This helps to prevent the capture of any air bubbles between the workpiece and the foil which could degrade the print quality. Once the foil is in full contact with the upper surface of the workpiece (FIG. 10), the entire image is scanned. Because the workpiece is being moved in direction 460 to reach successive scan lines, the head must also be moved at the same velocity. Alternatively, two dimensional laser beam scanning may be used.

After the image has been fully scanned, the foil is stripped from the workpiece all at once (FIG. 11) by pulling the head away from the workpiece. As shown the window may be moved away from the head to aid the stripping. Then the foil is advanced to expose a new ink area for use in printing the next workpiece.

A third alternative print head, FIG. 12, is a simplified version of the second alternative. Pressurized chamber 470 has a top window 472. A rubber pad 474 in the shape of a window frame is attached at the bottom of the chamber. Foil 476 is stretched across the rubber window. Only minimal pressure may be achieved against the foil before the workpiece is moved into contact because air escapes at both edges of the rubber window. But the minimal pressure which may be achieved causes the foil to curve downward lightly at its center 478. Once the foil is pressed against the rubber window, the pressurization inside the head provides a substantial force to hold the foil against the surface of the workpiece. The third alternative is simpler than the second, the foil is easier to load, and there is less chance of damage to the foil surface. But the workpiece must be able to be pulled from the foil, as there is no movable window to aid that process, more force must be applied to the workpiece, and bubbles may not be as easily eliminated.

The laser beam is delivered via a lens or window on top of the print head and passes through the hollow chamber to reach the foil.

An alternative print head design enables printing of irregular workpiece surfaces. Referring to FIGS. 26–26*b,* an air inflated polyethylene or polypropylene chamber, e.g., pillow 900, is inflated to a predetermined pressure (generally less than 10 psi but dependent on the size of the pillow and the application) and sealed to prevent the pressure from escaping. Pillow 900 is sealed such that pillow clamp flaps 905 extending from pillow 900 are produced. Clamp flaps 905 permit attachment of the pillow to the print head 902 of the laser transfer device with clamp 907. The size of the pillow is only limited by the scan capabilities of the associated laser optics.

During use (FIG. 26*a*) print head 902 exerts a downward force 904 of the pillow on the part 906 to be printed. Pillow 900 presses print foil 908 against the part 906 over the entire print surface. The internal pressure of the pillow, combined with the compliance of the thin gage polyethylene/polypropylene material of the pillow, creates an intimate contact between foil 908 and part 906. The laser scans the entire printed image through the non-opaque material of the pillow, transferring the ink to the printed part.

Pillow 900 allows for printing on irregular surfaces without losing intimate contact of the ink/carrier and the printed part.

Referring to FIGS. 27–27*a,* here a print head 920 which also permits printing of irregular workpiece surfaces includes a rubber pad 922 approximately 0.05 inch wide 940 surrounding an opening 924 approximately 0.100 inch wide 942. The length 944 of opening 924 is typically 0.25 to 2.0 inches. The rubber pad is mounted to a rigid support 926 of, for example, aluminum, having a corresponding slot shaped opening to that of opening 924. Through these slots is scanned a laser beam for the laser thermal transfer printing. The outer surface 928 of rubber pad 922 is made slippery, such as by covering with a Teflon® film. The desired coefficient of friction of outer surface 928 is generally less than 0.250.

Rubber pad 922 presses foil 908 against part 906. Foil 908 slides along film 928 exposing an area of foil 908 to printing. As used foil 930 emerges from edge 932 of the pad 922, tension 934 in the foil is used to strip (pull away) the foil from the part. The internal slot opening is pressurized via a connection to a regulated air pressure source (not shown) to maintain the required intimate contact between the foil and the part. Foil motion is provided by the coefficient of friction between the foil and the part being higher than the coefficient of friction between the foil and the slippery surface 928 of the rubber pad. The foil then moves (is pulled along) with the relative motion of the part. The pressure of part 906 on rubber pad 922 produces the seal between foil 908 and pillow 920. Head pressure can therefore be used as an indication of whether there is a part in place to be printed.

Advantages of print head 920 include the ability to maintain a seal to a part when the part is located in a recess, and the replacement of an active drive with the friction foil drive produced by the relative motion of the part past the print head.

Optimized Raster Scanning

Although the marking of a scan line of the image is typically done only during oscillation of the scanning mirror in only one direction, and no marking is done during the reverse scan or retrace, an alternative scheme performs marking of one line of a print of a given scan line on one workpiece during one direction of oscillation and another line of a print of the given scan line on a second workpiece during the return oscillation. In the example of FIG. 1, two identical monochrome images, for example, could be simultaneously marked on two surfaces at two of the printing stations by directing the scanned beam to one station during one direction of scanning and directing the scanned beam to the other printing station during the reverse direction of scanning. This allows essentially two images to be created in almost the same time that it would take to mark a single image in one direction scan marking.

Referring to FIG. 13, in one directional scanning, scanning occurs during a period 702 of relatively gradual motion 703. Scanning time is wasted during a period 704 of relatively rapid retrace motion 705. The percentage of wasted time may be on the order of 33%.

In FIG. 14, with two-directional scanning, the return scan motion 707 is symmetrical with the forward scan motion 709. The percentage of wasted time 708 is considerably less, largely because the retrace time is not wasted, but also because the wasted time 708 is somewhat shorter. It is shorter because change in velocity between forward and return scans is reduced, allowing a greater portion of each scan to be used, and a smaller portion to be wasted.

Both forward and return scans in theory could be used to paint a single print more rapidly, but that would produce a zig zag appearance of the scan lines as the workpiece is moved along during scanning. Parsing the forward and return scans between two marking stations precludes the zig-zag effect while retaining the speed advantage.

Referring to FIG. 15, in an alternative scanning scheme for use with a YAG laser 720, a single flat scanner mirror 500 and a single $f_{Theta}$ lens 502 are used to feed the beam to the three printing stations. The three mirrors 64, 66, 68, all direct the beam to the single scanner mirror 500 which is driven by a galvo 503. In this scheme, there is a single long printhead 512 for all three marking stations and the three workpieces 506, 508, 510 are moved in parallel for successive scan lines. The staging must then move each workpiece in a perpendicular direction after each partial print is finished in order to position it at the next marking station. Three foils 514, 516, 518 are also moved in parallel.

Other embodiments are within the scope of the following claims.

A wide spectrum of marking modes may be achieved because the system provides the ability to mark any pixel of an image at any one of several marking stations in each of several marking sub-cycles within a marking cycle and in each of the successive marking cycles. The printing of identical monochrome images on two workpieces and the printing of color images at three workstations (described above) are but two of possibilities. Other possibilities include the following.

More than three marking stations may be provided, offering the possibility of more than three colors in an image.

In a high mix mode production line, it would be possible to frequently change what is being printed on the workpieces being stepped along the line. For example, a chip manufacturer could "private label" chips in groups as small as a few each. Once the first batch, bearing the first logo image passes completely through the marking stations, a new logo image could be loaded into memory and the chips in the next group marked, and so on.

Serialization of the workpieces could be achieved by providing a window 802 in an image 804 for inclusion of the serial number 806 (FIG. 16). After each marking cycle, a subimage containing the new serial number is inserted into an image buffer at the location of the window for printing the next workpiece. In the case of three station printing, the third station could be the location where the serial number is printed. The partial prints at the first two stations would have non-printed windows to leave space for the serial number to be added at the third station. The main parts of the image and the serial number could be of different resolutions.

In some implementations a bar code reader could scan a unit/lot traveler record and automatically download an appropriate image for that unit or lot from a network server.

In another example, a global memory could serve as the image transfer medium between the image generation software and the machine control processor in a Windows NT environment.

A wide variety of workpieces and surfaces may be marked.

There may be more or fewer than three marking stations.

Marking could be done by ablation of the surfaces without use of inks.

Other information may be found in U.S. patent application Ser. No. 08/149,285, incorporated by reference.

In particular, the print foil is a transfer printing medium capable of converting laser energy to heat in which a curable laser-transferrable ink having one or more layers is deposited on a carrier. The carrier must have sufficiently low surface energy to permit transfer of the ink. It also must not melt or otherwise deform upon laser irradiation. Examples of suitable carriers include flexible plastic films such as polyethylene, polypropylene, and polyester.

The transfer medium is capable of converting laser energy to heat to promote transfer of the ink from the carrier to the surface of interest. To this end, one or more thermal convertors are incorporated into the carrier, the ink, or both. The thermal convertors may be separate additives or may be part of the prepolymer.

In the case of separately added convertors included in the ink, the amount of convertor ranges from about 0.25 to about 30% by weight (based upon the total solids content of the ink). The particular convertor is selected based upon the particular laser energy used for irradiation. In the case of $CO_2$ lasers, the preferred convertors are carbon black, polyethylene glycol (e.g., PEG 3000 commercially available from Union Carbide), talc (e.g., Nytal 400 commercially available from R. T. Vanderbilt), and PPZ, a phosphotriazine commercially available from Idemitsu Petrochemicals Co. Ltd; PPZ may also function as a prepolymer. In the case of Nd:YAG lasers, the preferred convertors are IR99, IRA 980, and IR165, all of which are proprietary dyes commercially available from Glendale Protective Technologies, IR dye 14,617 (a proprietary dye commercially available from Eastman Kodak), and Projet 900NP (a proprietary dye commercially available from ICI). In the case of diode lasers, the preferred convertors are IR dye 14,617 and IRA 980.

The inks may have one or more layers, with particular ingredients (e.g., prepolymer, polymerization initiator, etc.) being present in any of the layers. One example of ink is a one layer ink (referred to here as a "one-pass" coating) having a curable color coat that includes, in a single layer, a curable prepolymer, a polymerization initiator, and a colorant. Another example is a two layer ink (referred to here as a "two-pass" coating) having a color coat (which may be curable or non-curable) in combination with an overlying curable size coat that includes a curable prepolymer and a polymerization initiator.

Because the inks are curable, adhesion upon transfer to a surface of interest is improved. The advantage of the size coat (which is transferred with the color coat upon laser irradiation) is that adhesion is further enhanced, thereby making it possible to use even a non-curable color coat.

The inks contain one or more curable prepolymers, with the total amount of curable prepolymer ranging from 25 to 95% by weight (based upon the total solids content of the ink). Curable prepolymers useful in the invention have two or more functional groups available for crosslinking (which occurs either simultaneously with transfer upon application of laser radiation or following laser irradiation in a separate thermal or photochemical cure step).

One class of suitable curable prepolymers includes epoxy-functionalized prepolymers such as bisphenol A diglycidyl ether (commercially available from Shell Oil under the designation Epon 1001) and epoxy-functionalized novolac resins (e.g., Epon 164 commercially available from Shell Oil). Lower molecular epoxies such as UVR6110 (a liquid diepoxide commercially available from Union Carbide) may be added as well.

A second class of suitable curable prepolymers includes these epoxy-functionalized prepolymers in combination with one or more vinyl ether-functionalized prepolymers which co-cure with the epoxy-functionalized prepolymers. Examples of suitable vinyl ether-functionalized prepolymers include bisphenol A-divinyl ether adduct; 2,4-toluene diisocyanate/hydroxybutyl vinyl ether adduct; cyclohexyl divinyl ether commercially available from GAF or ISI Products; vinyl ethyl ether, vinyl isobutyl ether, vinyl octadecyl ether, polyethylene glycol divinyl ether, polytetrahydrofuran/350/divinyl ether, and trimethylol propane trivinyl ether, all of which are commercially available from BASF; Rapi/cure divinyl ether/3, Rapi/cure cyclohexyl vinyl ether, Rapi/cure PEPC, and Rapi/cure hydroxy butyl vinyl ether, all of which are commercially available from ISP; and Vectomers 2010, 2031, 2032, 4010, 4020, and 4030, all of which are commercially available from Allied-Signal.

A third class of suitable curable prepolymers includes the above-described epoxy-functionalized prepolymers in combination with one or more acrylate-functionalized prepolymers. Examples of acrylate-functionalized prepolymers include RDX 29522 and Ebecryl 639 (both of which are commercially available from Radcure); Sartomer 351 (commercially available from Sartomer); and NR440 (commercially available from Zeneca Resins).

A fourth class of suitable curable prepolymers includes the acrylate-functionalized prepolymers themselves without the epoxy-functionalized prepolymers.

A fifth class of suitable curable prepolymers includes blocked isocyanate-functionalized prepolymers. Examples include B1299 (commercially available from Huls) and BL4165A (commercially available from Miles).

A sixth class of suitable curable prepolymers includes the above-described vinyl ether-functionalized prepolymers in combination with maleate- or maleimide-functionalized prepolymers. Examples of maleate-functionalized prepolymers include 89-8902 (commercially available from Cargil Products); and Astrocure 78HV and Astrocure 78LV (both of which are commercially available from Zircon). Examples of maleimide-functionalized prepolymers include BMI/S/M/20/TDA (commercially available from Mitsui Toatsu Chemical, Inc.

One or more non-curable layers may be used in combination with one or more curable layers. For example, a non-curable color coat may be combined with an overlying curable size coat. Suitable non-curable resins are thermoplastic film-forming resins. Examples include acrylic resins such as Rhoplex B85 (an acrylic dispersion commercially available from Rohm & Haas) and Amsco 3011 (an acrylic dispersion available from Rohm & Haas); urethane resins such as QW-16 (a urethane dispersion useful as a film-former that is commercially available from K. J. Quinn); phenoxy resins such as PKHW 35 (commercially available from Union Carbide); and combinations thereof. The amount of non-curable prepolymer in the ink ranges from about 15 to about 35% by weight (based upon the total solids content of the ink).

The inks also contain a polymerization initiator in an amount ranging from about 0.1 to 5% by weight (based upon the total solids content of the ink). The initiator (which typically is a free radical or cationic initiator) may be a photochemical initiator or a thermal initiator; in some cases, the same initiator can act as both a thermal and a photochemical initiator. In the case of multi-layer inks containing multiple curable layers, layers containing photochemical initiators may be combined with layers containing thermal initiators. In addition, some initiators may be used in conjunction with accelerators such as benzpinacole, copper II salts (e.g., copper benzoate), and hexaphenylethane.

In the case of thermal initiators, the initiator must exhibit good stability at ambient temperature to prevent premature curing of the prepolymer. In addition, the initiation temperature must be within the range achievable by laser irradiation. Examples of suitable thermal initiators for cationic initiation include aryl sulfonium salts (e.g., the salts described in WO90/11303, hereby incorporated by reference); aryl iodonium salts (e.g., UVE 9310 and U 479, both of which are commercially available from General Electric); and ammonium salts (e.g., FC520, commercially available from 3M). Examples of suitable thermal initiators for free radical initiation include the class of compounds leading to peroxy radicals, e.g., hydroperoxides, peroxyesters, and peroxyketals; representative compounds are commercially available from Elf-Atochem. Also suitable for free radical initiation are azo polymerization initiators commercially available from Wako.

In the case of photochemical initiators, the initiator must also exhibit good stability at ambient temperature to prevent premature curing of the prepolymer. In addition, it must exhibit absorption maxima in regions of the electromagnetic spectrum different from the regions in which the colorant exhibits absorption maxima. Examples of suitable photochemical initiators for cationic initiation include aryl sulfonium salts (e.g., UVI 6974 commercially available from Union Carbide) and aryl iodonium salts (e.g., UVE 9310 and U 479, both of which are commercially available from General Electric). Another example of a suitable initiator for cationic initiation is hydroxy naphthyl imide sulfonate ester. Examples of suitable photochemical initiators for free radical initiation include CPTX and ITX (both commercially available from Ciba-Geigy), each of which is combined with methyl diethanolamine (commercially available from Aldrich Chemical Co.; lucerin TPO (commercially available from BASF) combined with methyl diethanolamine; Darcure 4265 (commercially available from Ciba Geigy), and Irgacure 369 combined with ITX.

The ink contains one or more colorants, which may be dyes, pigments, or metallized coatings (e.g., an aluminized coating). In the case of dyes and pigments, the colorant is present in an amount ranging from about 35 to 65% by weight (based upon the total solids content of the ink). The particular colorant is chosen based upon the color desired on the final printed surface. Examples of suitable colorants include pigments such as talc, $TiO_2$ (white), phthalogreen (GT-674-D), chrome green oxide (6099), ultramarine blue (RS-9), black oxide (BK-5099D), Kroma red (7097), and Novaperm yellow (HR-70), and dyes such as dynonicidine (2915) and Dianell orange, as well as the aforementioned metallized coatings.

In the case of inks containing photocurable prepolymers, a sensitizer may be added in an amount ranging from about 0.5 to 8% by weight (based upon the total solids content of the ink) to extend the irradiating wavelength for photoinitiation into the visible region. Such sensitizers are useful, for example, where the formulation contains large amounts of $TiO_2$ pigment which absorbs light below 400 nm and thus competes with the initiator. Examples of suitable sensitizers, all of which are commercially available from Aldrich Chemical Co., include perylene, rubrene, phenothiazine, anthracene derivatives, and thioxanthones, as well as lucerin TPO (commercially available from BASF).

Other ingredients which may be added to the inks to improve the coatability, printability, print performance, and durability of the inks include various surfactants, dispersing agents, and polymer dispersions. The amount of each ingredient is selected based upon the desired properties. Examples of suitable surfactants (which may be anionic, cationic, or nonionic) include Triton X-100 (an aryl ethoxylate commercially available from Rohm & Haas) and FC 430 (a fluoroaliphatic polymeric ester available from 3M). Examples of suitable dispersing agents include polyacrylate salts such as Daxad 30, a 30% aqueous solution of polysodiumacrylate commercially available from W. R. Grace. Examples of suitable dispersions include Shamrock 375 and Aquacer 355, both of which are polyethylene wax dispersions commercially available from Diamond Shamrock.

The transfer medium according to the invention is prepared by combining the ink ingredients in an aqueous or organic solvent (with aqueous solvents being preferred), and then applying the resulting composition to the carrier. If a size coat is used, it is applied on top of the color coat. To facilitate coating, the total solids content of the ink is adjusted to be between 10 and 50% by weight of the ink. The coated carrier is then irradiated with laser light to transfer the ink from the carrier to a desired surface, e.g., the surface of a semiconductor device. Suitable lasers include $CO_2$ lasers (irradiation wavelength equals 10.6 $\mu$m), Nd:YAG lasers (irradiation wavelength equals 1.06 $\mu$m), and diode lasers (irradiation wavelength equals, e.g., 0.9 $\mu$m). The particular irradiation wavelength, power, and time of application parameters are selected to ensure clean transfer.

In the case of some inks, laser irradiation both transfers and cures the ink simultaneously. With other inks, a separate thermal or photochemical cure is effected following transfer. The cure conditions are selected based upon the particular prepolymers and initiators used in the formulation.

The invention will now be further described by way of the following examples.

EXAMPLE 1

This example describes the preparation of a transfer medium having one-pass, thermally curable, cationically initiated, ink.

The following ingredients were combined to form a laser-transferrable ink (all amounts in weight percent):

| | |
|---|---|
| $TiO_2$ | 55.0 |
| Bisphenol A-DVE adduct | 13.0 |
| 35201[1] | 24.8 |
| PEG 3000[2] | 5.0 |
| Aryl sulfonium salt[3] | 2.0 |
| Triton X-100[4] | 0.2 |

[1]Aqueous dispersion of bisphenol A-epichlorohydrin adduct formerly available from Rhone-Poulenc.
[2]Polyethylene glycol ($M_n$ = 3000) commercially available from Union Carbide.
[3]Aryl sulfonium salt thermal initiator of the type described in WO90/11303.
[4]Surfactant commercially available from Rohm & Haas.

Water was added to adjust the total solids content to 35% by weight, after which the resulting ink was coated onto a 1.2 mil thick polypropylene carrier film using a #15 mayer rod. The coated surface of the film was then placed in intimate contact with the surface of a molded semiconductor device. Next, a $CO_2$ laser was directed through the uncoated side of the carrier film to transfer the ink to the surface of the semiconductor device. The laser dwelled on each addressed pixel for 16 $\mu$sec. The power output of the laser at the point of contact with the coated film was 14.5 W. The device bearing the transferred image was then placed in a forced hot air oven for 30 min. at 175° C. to cure the ink. After curing, the transferred image was found to be resistant to treatment with 1,1,1-trichloroethane (3 min. soak, 10 brush strokes, cycled 3 times).

EXAMPLE 2

This example describes the preparation of a transfer medium having a two-pass, cationically initiated ink in which both the color coat and the size coat are photochemically curable.

The following ingredients were combined to form a photochemically curable color coat (all amounts in weight percent):

| | |
|---|---|
| $TiO_2$ | 55.0 |
| 2,4-toluene diisocyanate/HBVE adduct[1] | 35.8 |
| QW-16 (urethane dispersion)[2] | 2.0 |
| PPZ[3] | 5.0 |
| Triton X-100[4] | 0.2 |
| UVI 6974[5] | 2.0 |

[1]Hydroxy butyl divinyl ether adduct.
[2]Pre-made urethane dispersion commercially available from K. J. Quinn.
[3]Commercially available from Idemitsu Petrochemicals Co. Ltd.
[4]Surfactant commercially available from Rohm & Haas.
[5]Triaryl sulfonium salt-based initiator commercially available from Union Carbide.

Water was added to adjust the total solids content to 35% by weight, after which the resulting color coat was applied to a 1.2 mil thick polypropylene carrier film using a #13 mayer rod.

The following ingredients were combined to form a photochemically curable size coat (all amounts in weight percent):

| | |
|---|---|
| EPON 1001[1] | 89.1 |
| UVI 6110[2] | 5.45 |
| FC-430[3] | 2.47 |
| UVI 6974[4] | 1.68 |
| Perylene[5] | 0.3 |
| PPZ[6] | 1.0 |

[1]Bisphenol A diglycidyl ether commercially available from Shell Oil Co.
[2]Liquid diepoxide commercially available from Union Carbide.
[3]Fluoroaliphatic polymeric ester surfactant commercially available from 3M Co.
[4]Triaryl sulfonium salt-based initiator commercially available from Union Carbide.
[5]Photosensitizer commercially available from Aldrich Chemical Co.
[6]Commercially available from Idemitsu Petrochemicals Co. Ltd.

Methyl ethyl ketone was added to adjust the total solids content of the size coat to 25% by weight, after which the resulting size coat was applied on top of the color coat using a #5 mayer rod.

The coated surface of the film was then placed in intimate contact with the surface of a molded semiconductor device. Next, a $CO_2$ laser was directed through the uncoated side of the carrier film to transfer the ink (color coat plus size coat) to the surface of the semiconductor device. The laser dwelled on each addressed pixel for 20 μsec. The power output of the laser at the point of contact with the coated film was 14.5 W. The device bearing the transferred image was then cured (5 min. at a 150° C. preheat, followed by a 3.6 sec exposure to UV radiation). The resulting cured printed image was found to be resistant to treatment with 1,1,1-trichloroethane (3 min. soak, 10 brush strokes, cycled 3 times).

EXAMPLE 3

This example describes the preparation of a transfer medium having a two-pass, cationically curable ink in which the color coat is non-curable and the size coat is thermally curable.

The following ingredients were combined to form a non-curable color coat (all amounts in weight percent):

| | |
|---|---|
| Water | 54.0 |
| Daxad 30[1] | 0.5 |
| $TiO_2$ | 38.4 |
| Triton X-100[2] | 0.5 |
| Shamrock 375[3] | 6.2 |
| Rhoplex B85[4] | 1.4 |
| Amsco 3011[5] | 7.7 |

[1]Polyacrylate dispersing agent commercially available from W. R. Grace.
[2]Surfactant commercially available from Rohm & Haas.
[3]Polyethylene wax dispersion commercially available from Diamond Shamrock.
[4]Acrylic dispersion commercially available from Rohm & Haas.
[5]Acrylic dispersion commercially available from Rohm & Haas.

Enough ammonium hydroxide was added to adjust the pH to 8.5, after which the resulting color coat was applied to a 1.2 mil thick polypropylene carrier film at a coat weight of 69 mg/m².

The following ingredients were combined to form a photochemically curable size coat (all amounts in weight percent):

| | |
|---|---|
| EPON 1001[1] | 88.2 |
| UVR 6110[2] | 11.6 |
| FC-430[3] | 3.0 |
| UV 479[4] | 1.6 |
| IR 99[5] | 0.5 |
| Benzpinacole[6] | 0.47 |

[1]Bisphenol A diglycidyl ether commercially available from Shell Oil Co.
[2]Liquid diepoxide commercially available from Union Carbide.
[3]Fluoroaliphatic polymeric ester surfactant commercially available from 3M Co.
[4]Iodonium salt thermal initiator commercially available from General Electric.
[5]Dye commercially available from Glendale Protective Technologies.
[6]Accelerator commercially available from Aldrich Chemical Co.

Methyl ethyl ketone was added to adjust the total solids content of the size coat to 25% by weight, after which the resulting size coat was applied on top of the color coat using a #5 mayer rod.

The coated surface of the film was then placed in intimate contact with the surface of a molded semiconductor device. Next, a Nd:YAG laser was directed through the uncoated side of the carrier film to transfer the ink (color coat plus size coat) to the surface of the semiconductor device. The laser dwelled on each addressed pixel for 18 μsec. The power output of the laser at the point of contact with the coated film was 4.5 W. The device bearing the transferred image was then cured (4 min. at 175° C.). The resulting cured printed image was found to be resistant to treatment with 1,1,1-trichloroethane (3 min. soak, 10 brush strokes, cycled 3 times).

EXAMPLE 4

This example describes the preparation of a transfer medium having a one-pass, thermally curable, cationically initiated ink in which transfer and cure takes place in a single step upon laser irradiation.

The following ingredients were combined to form a laser-transferrable ink (all amounts in weight percent):

| | |
|---|---|
| Talc[1] | 30.0 |
| UVE 9310[2] | 7.0 |
| Copper benzoate[3] | 0.14 |
| Epon 164[4] | 51.43 |
| CHVE5[4] | 11.43 |

[1]Nytal 400 commercially available from R. T. Vanderbilt.
[2]Photo and thermal initiator commercially available from General Electric.
[3]Accelerator commercially available from Aldrich Chemical Co.
[4]Epoxy novolac resin having an epoxy equivalent of 200–240 commercially available from Shell Oil.
[5]Cyclohexyl divinyl ether commercially available from GAF or ISI Products.

Methyl ethyl ketone was added to adjust the total solids content to 50% by weight, after which the resulting ink was coated onto a 1.2 mil thick polypropylene carrier film using a #10 mayer rod. The coated surface of the film was then placed in intimate contact with a glass slide. Next, a $CO_2$ laser was directed through the uncoated side of the carrier film to transfer the ink to the surface of the glass slide. The laser dwelled on each addressed pixel for 80 μsec. After addressing, the transferred coating was removed form the glass slide and analyzed by differential scanning calorimetry. There was no evidence of residual heat of reaction, indicating that the transferred coating had cured during the transfer step.

EXAMPLE 5

This example describes the preparation of a transfer medium having a two-pass, free radical-initiated ink in which both the color coat and the size coat are photochemically curable.

The following ingredients were combined to form a photochemically curable color coat (all amounts in weight percent):

| | |
|---|---|
| $TiO_2$ | 65.0 |
| Aquacer 355[1] | 11.0 |
| NR 440[2] | 18.8 |
| PPZ[3] | 3.0 |
| Triton X-100[4] | 0.2 |
| Daracure 4265[5] | 2.0 |

[1]Polyethylene wax dispersion commercially available from Diamond Shamrock.
[2]Acrylate-functionalized prepolymer commercially available from Zeneca Resins.
[3]Commercially available from Idemitsu Petrochemicals Co. Ltd.
[4]Surfactant commercially available from Rohm & Haas.
[5]Photochemical free radical initiator commercially available from Ciba Geigy.

Water was added to adjust the total solids content to 40% by weight, after which the resulting color coat was applied to a 1.2 mil thick polypropylene carrier film using a #13 mayer rod.

The following ingredients were combined to form a photochemically curable size coat (all amounts in weight percent):

| | |
|---|---|
| NR 440[1] | 78.0 |
| Ebecryl 639[2] | 20.0 |
| Daracure 4265[3] | 2.0 |

[1]Acrylate-functionalized prepolymer commercially available from Zeneca Resins.
[2]Acrylate-functionalized prepolymer commercially available from Radcure.
[3]Photochemical free radical initiator commercially available from Ciba Geigy.

Water was added to adjust the total solids content of the size coat to 40% by weight, after which the resulting size coat was applied on top of the color coat using a #5 mayer rod.

The coated surface of the film was then placed in intimate contact with the surface of a molded semiconductor device. Next, a $CO_2$ laser was directed through the uncoated side of the carrier film to transfer the ink (color coat plus size coat) to the surface of the semiconductor device. The laser dwelled on each addressed pixel for 20 $\mu$sec. The power output of the laser at the point of contact with the coated film was 14.5 W. The device bearing the transferred image was then cured (5 min. at a 100° C. preheat, followed by passage through a UV fusion oven equipped with an H bulb at a speed of 100 in./min.). The resulting cured printed image was found to be resistant to treatment with 1,1,1-trichloroethane (3 min. soak, 10 brush strokes, cycled 3 times).

What is claimed is:

1. Apparatus for marking pixels on workpieces, comprising marking stations at which said workpieces are respectively positioned for marking, a beam of radiation directed along an optical path toward said workpieces, scanning apparatus for scanning said beam to define an array of pixel positions, said scanning apparatus including an optical element having a scan surface which is movable to chance an angle of said scan surface relative to said optical path for sweeping said beam along a scan line, and a switch for routing said beam during said scanning so that for each of said pixel positions said beam may be routed to a selected one of said marking stations to mark one of said pixels on one of said workpieces.

2. The apparatus of claim 1 wherein said pixels marked on said workpieces are organized as partial prints associated respectively with said marking stations.

3. The apparatus of claim 2 wherein said partial prints are different for different ones of said marking stations.

4. The apparatus of claim 2 further comprising a processor for causing each said workpiece to be moved in succession to each of said marking stations for marking with corresponding ones of said partial prints.

5. The apparatus of claim 2 wherein there are two of said marking stations, said scanning apparatus is arranged to raster scan a series of scan lines, every other line being scanned in one direction and intervening lines being scanned in an opposite direction, and said switch is arranged to cause marking of pixels on said every other line at one of said marking stations, and marking of pixels on said intervening lines at the other of said marking stations.

6. The apparatus of claim 5 wherein the partial prints for the workpieces at said two marking stations comprise identical, monochrome prints.

7. The apparatus of claim 1 wherein said scanning apparatus is configured to raster scan said beam.

8. The apparatus of claim 1 further comprising
a processor for causing each of said workpieces to be positioned at each of said marking stations for a period which spans a complete scanning of said beam.

9. The apparatus of claim 1 further comprising printing apparatus responsive to said beam for printing different colors of said pixels respectively at different ones of said marking stations.

10. The apparatus of claim 1 wherein said marking stations comprise printing foils which respond to radiation from said beam by depositing pigment or dye.

11. The apparatus of claim 1 wherein said switch comprises an acousto-optic deflector.

12. The apparatus of claim 11 further comprising a processor for controlling said acousto-optic deflector in response to stored information corresponding to said pixels.

13. The apparatus of claim 1 wherein said scanning apparatus further comprises a mechanical element for moving each of said workpieces in a direction normal to said scan line.

14. The apparatus of claim 1 wherein portions of said partial prints are identical for at least two of said workpieces and other portions are different for said partial prints.

15. The apparatus of claim 14 wherein said portions which are different comprise different serial numbers.

16. Apparatus for marking pixels on workpieces, comprising marking stations at which said workpieces are respectively positioned for marking, said pixels marked on said workpieces being organized as partial prints associated with respective ones of said marking stations, a beam of radiation directed along an optical path toward said workpieces, scanning apparatus for raster scanning said beam to define an array of pixel positions, said scanning apparatus including an optical element having a scan surface which is movable to chance an angle of said scan surface relative to said optical path for sweeping said beam along a scan line, a switch for routing said beam during said scanning so that for each of said pixel positions said beam may be routed to a selected one of said marking stations to mark one of said pixels on one of said workpieces, a processor for causing each of said workpieces to be positioned at each of said marking stations for a period which spans a complete scanning of said beam, and printing apparatus responsive to said beam for printing different colors of said pixels respectively at different ones of said marking stations, said marking stations comprising printing foils which respond to radiation from said beam by depositing pigment or dye.

17. A method for marking pixels on workpieces, comprising positioning said workpieces at respective stations for marking, directing a beam of radiation along an optical path toward said workpieces, scanning said beam by moving a scan surface to change an angle of a scan surface relative to said optical path to define an array of pixel positions, and routing said beam during said scanning so that for each of said pixel positions said beam may be routed to a selected one of said marking stations to mark one of said pixels on one of said workpieces.

18. Apparatus for forming a mark on a workpiece, comprising a marking station at which said workpiece is stationed for producing and curing the mark, a first optical path from a first radiation source to a position on said workpiece for producing the mark, and a second optical path from a second radiation source to said position on said workpiece for curing said mark.

19. The apparatus of claim 18 further including an optical element for sweeping said first and second beams along a scan line for producing multiple marks on the workpiece.

20. The apparatus of claim 18 further including a scan lens for focusing said first and second beams at an image plane located coincident with a surface of said workpiece.

21. The apparatus of claim 20 wherein said scan lens has substantially the same focal length for said first beam and said second beam.

22. The apparatus of claim 20 wherein said scan lens comprises an achromatic scan lens constructed from two different glasses.

23. The apparatus of claim 18 wherein said mark is produced and cured substantially simultaneously.

24. The apparatus of claim 18 further including a beam combiner for combining said first and second beams.

25. The apparatus of claim 24 wherein said beam combiner includes a coating for reflecting said first beam and passing said second beam.

26. The apparatus of claim 18 wherein said first beam is at a wavelength of about 971 to 981 nm.

27. The apparatus of claim 18 wherein said second beam is at a wavelength of about 671 nm.

28. The apparatus of claim 18 wherein said first beam is produced by a first diode laser and said second beam is produced by a second diode laser.

29. A method for forming a mark on a workpiece, comprising directing a first beam of radiation along a first optical path toward said workpiece to produce said mark, directing a second beam of radiation along a second optical path toward said workpiece to cure said mark, producing and curing said mark while maintaining a position of said workpiece.

30. The method of claim 29 further comprising directing multiple first and second beams of radiation toward said workpiece to produce multiple marks on the workpiece.

31. The method of claim 29 further including sweeping said first and second beams along a scan line.

32. The method of claim 29 further including focusing said first and second beams at an image plane located coincident with a said surface of said workpiece.

33. The method of claim 29 wherein said mark is produced and cured substantially simultaneously.

34. The method of claim 29 further including combining said first and second beams.

35. Apparatus for marking two workpieces comprising marking stations at which said workpieces are respectively positioned for marking, a beam of radiation directed along an optical path toward said workpieces, two-directional scanning apparatus for scanning said beam to define successive rows of pixel positions in an array, some of said rows being scanned by scanning motion in a first direction, others of said rows being scanned by scanning motion in an second direction opposite to said first direction, said two-directional scanning apparatus including an optical element having a scan surface which is movable to change an angle of said scan surface relative to said optical path for sweeping said beam along a scan line, and switching elements for routing said beam during said scanning to a selected one of said marking stations to scan some of said rows at one of said marking stations and others of said rows at another of said marking stations.

36. The apparatus of claim 35 wherein every other one of said rows is scanned in said one direction at one of said marking stations, and said intervening rows are scanned in said opposite direction at said other one of said marking stations.

* * * * *